(12) United States Patent
Into

(10) Patent No.: US 8,274,608 B2
(45) Date of Patent: Sep. 25, 2012

(54) IMAGE PROCESSING APPARATUS, AND METHOD FOR CONTROLLING AN IMAGE PROCESSOR

(75) Inventor: Shozo Into, Kanagawa (JP)

(73) Assignee: Sony Corporation, Tokyo (JP)

( * ) Notice: Subject to any disclaimer, the term of this patent is extended or adjusted under 35 U.S.C. 154(b) by 393 days.

(21) Appl. No.: 12/715,748

(22) Filed: Mar. 2, 2010

(65) Prior Publication Data

US 2010/0259687 A1  Oct. 14, 2010

(30) Foreign Application Priority Data

Apr. 10, 2009 (JP) ................................. 2009-095480

(51) Int. Cl.
*H04N 5/268* (2006.01)

(52) U.S. Cl. ........ 348/705; 348/706; 348/578; 348/584; 348/722; 348/659; 348/441

(58) Field of Classification Search .................. 348/705, 348/706, 578, 584, 722, 441, 659
See application file for complete search history.

(56) References Cited

U.S. PATENT DOCUMENTS

| 5,781,250 | A  | * | 7/1998  | Jun ............................. | 348/706 |
| 6,130,725 | A  | * | 10/2000 | Liron .......................... | 348/705 |
| 7,013,361 | B2 | * | 3/2006  | Liron .......................... | 710/316 |
| 7,190,412 | B2 | * | 3/2007  | Ellett ......................... | 348/705 |
| 7,920,557 | B2 | * | 4/2011  | Moote ......................... | 370/389 |
| 2007/0024760 | A1 | * | 2/2007 | Okanno ........................ | 348/706 |
| 2007/0143576 | A1 | * | 6/2007 | Ellgen et al. ................. | 712/10 |

FOREIGN PATENT DOCUMENTS

JP   2007-325112   12/2007

* cited by examiner

*Primary Examiner* — Jefferey Harold
*Assistant Examiner* — Mustafizur Rahman
(74) *Attorney, Agent, or Firm* — Oblon, Spivak, McClelland, Maier & Neustadt, L.L.P.

(57) ABSTRACT

In an image processing apparatus, an image processor includes: a matrix switcher, wherein intersecting input and output lines are connected by crosspoint switches; a signal processing block connected to output lines on the upstream side, and input lines on the downstream side by reentry paths; and an output block connected to output lines on the upstream side. An external reentry settings unit sets a first and second port of the matrix switcher as external reentry output ports, the first port being a matrix switcher output port, and the second port being a matrix switcher input port. A reentry stage information generator generates reentry stage information, which indicates the stage of the internal signal processing path where a special function unit is logically positioned, and wherein the special function unit corresponds to the external reentry output ports of the signal processing block and the output block.

7 Claims, 20 Drawing Sheets

FIG. 3

| OUT# | REENTRY IN |
|---|---|
| OUT-1 | IN-6 |
| OUT-2 | N/A |
| OUT-3 | N/A |
| OUT-4 | N/A |
| OUT-5 | N/A |
| OUT-6 | N/A |
| OUT-7 | N/A |
| OUT-8 | N/A |

N/A: NOT AVAILABLE

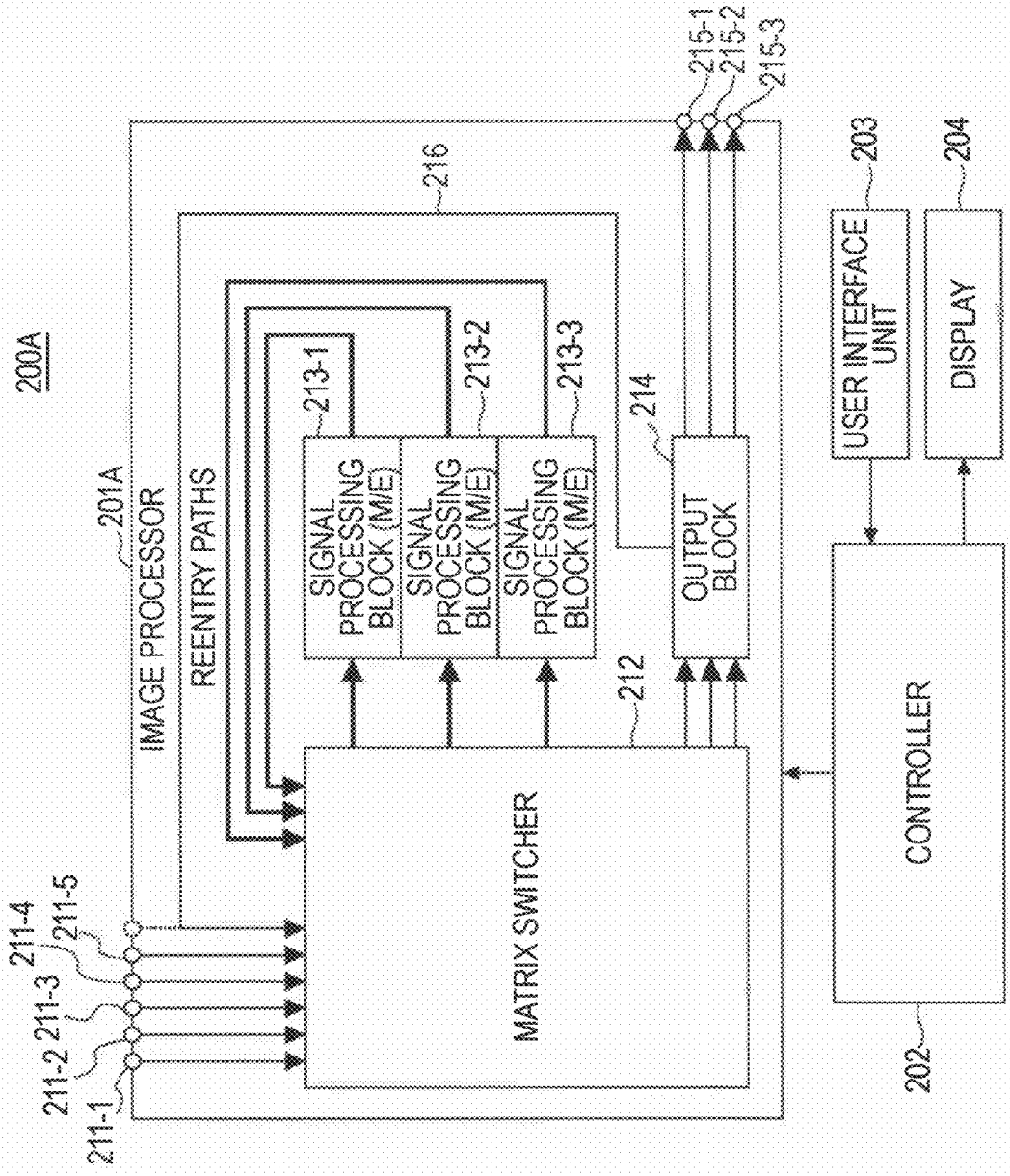

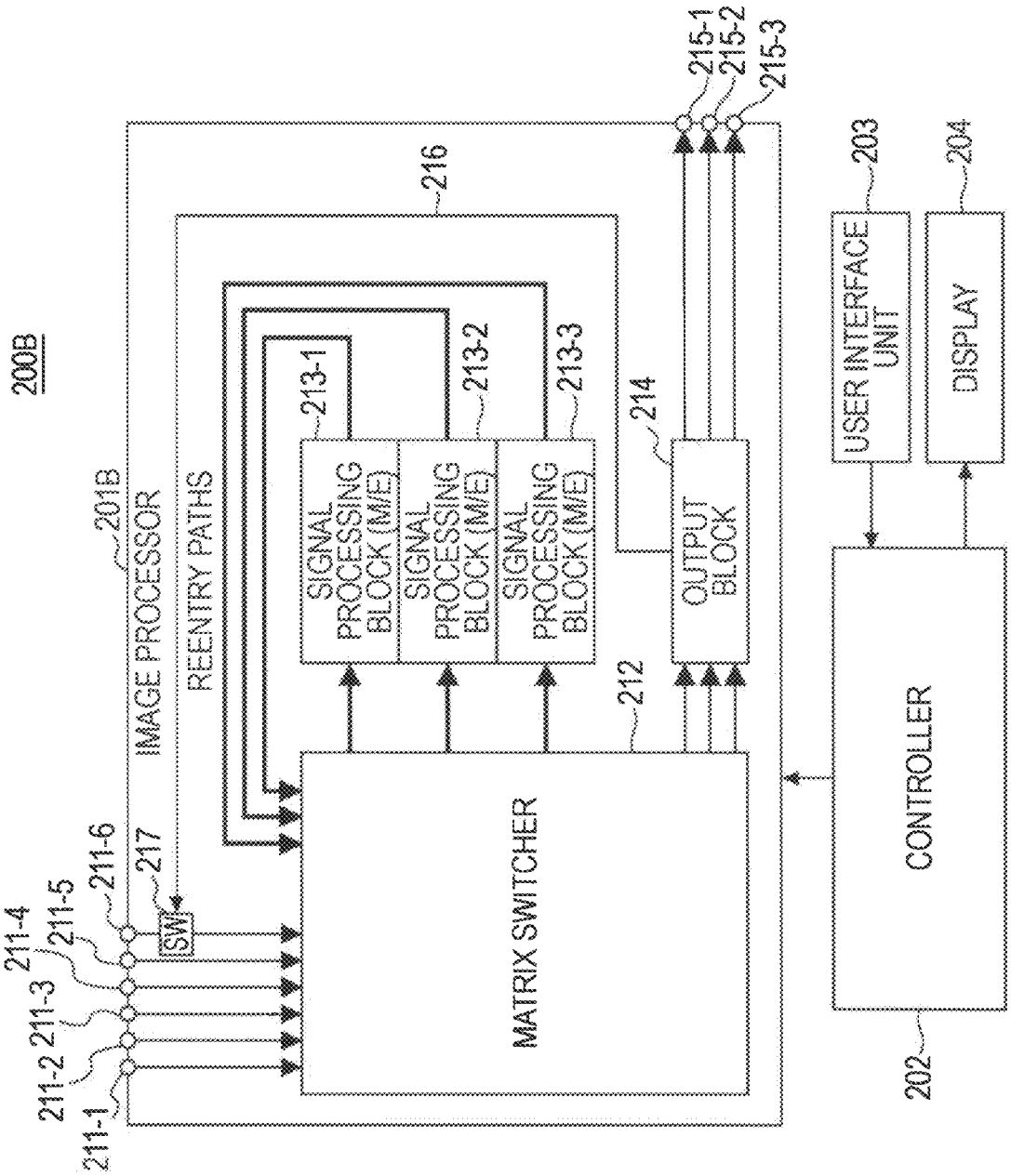

IMAGE PROCESSING APPARATUS, AND METHOD FOR CONTROLLING AN IMAGE PROCESSOR

BACKGROUND OF THE INVENTION

1. Field of the Invention

The present invention relates to an image processing apparatus, and to a method for controlling an image processor. More particularly, the present invention relates to an image processing apparatus and a method whereby a plurality of inputs/outputs and a plurality of signal processing blocks are connected via a matrix switch.

2. Description of the Related Art

Image processing apparatus referred to as effects switchers have been developed (see Japanese Unexamined Patent Application Publication No. 2007-325112, for example). Such an image processing apparatus performs special effects processing during the production or broadcasting of a program, such as switching images, superimposing subtitles onto images by means of keying, or positioning a separate sub-screen somewhere within the main screen.

FIG. 18 illustrates an exemplary configuration of an image processing apparatus 200 in accordance with the related art. The image processing apparatus 200 includes an image processor 201, a controller 202, a user interface unit 203, and a display 204.

The controller 202 controls the operation of the image processor 201. The user interface unit 203 and the display 204 constitute a user interface, and are connected to the controller 202. The image processor 201 includes input ports 211-1 to 211-6, a matrix switcher 212, signal processing blocks (i.e., Mix/Effects (M/E) blocks) 213-1 to 213-3, an output block 214, and output ports 215-1 to 215-3.

The input ports 211-1 to 211-6 are ports for inputting image signals (i.e., footage) from external equipment. Herein, the external equipment may be players for footage playback, text generators, or CG apparatus, for example. The output ports 215-1 to 215-3 are ports for outputting image signals to external equipment. The signal processing blocks 213-1 to 213-3 process signals for processes such as keying and wiping, for example. The output block 214 performs phase alignment (i.e., one line-delay) and adapts signals to a signal standard, while also processing signals for output.

The matrix switcher 212 supplies selected signals to the internal signal processing blocks and the output block. The signals are selected from among the reentry inputs from the external inputs and the internal signal processing blocks. Although not shown in the drawings, the matrix switcher 212 herein is realized by a plurality of input lines arranged in one direction, a plurality of output lines arranged in another direction and intersecting the input lines, and a plurality of crosspoint switches, which connect the input lines to the output lines at each crosspoint where the input lines and the output lines intersect.

The input ports 211-1 to 211-6 are connected to a portion of the input lines of the matrix switcher 212. In addition, the upstream sides of the signal processing blocks 213-1 to 213-3 are connected to a portion of the output lines of the matrix switcher 212, while the downstream sides are connected to a portion of the input lines of the matrix switcher 212 via reentry paths. In addition, the upstream side of the output block 214 is connected to a portion of the output lines of the matrix switcher 212, while the output ports 215-1 to 215-3 lead from the downstream side.

SUMMARY OF THE INVENTION

In the image processor 201 of the image processing apparatus 200 shown in FIG. 18, reentry paths are provided for routing output signals from the signal processing blocks 213-1 to 213-3 as reentry inputs into the matrix switcher 212.

In some cases, it may be desirable to use the output signal from a special function unit of the output block 214 on the upstream side of the internal signal processing path, similarly to the output signals from the signal processing blocks 213-1 to 213-3. However, in the image processor 201 of the image processing apparatus 200 shown in FIG. 18, a reentry path is not provided for output signals from the output block 214, and thus special function units of the output block 214 are not available for use upstream to or partway along the internal signal processing path.

Given the above, it is conceivable to select one of the output ports 215-1 to 215-3 outputting an output signal from a special function unit of the output block 214, and connect that output port to one of the input ports 211-1 to 211-6 with an external cable. Because of time requirements for image processing in the image processor 201, and in order to simplify the system, image signals output from the output ports 215-1 to 215-3 are typically provided one line-delayed with respect to a reference signal. For this reason, when an output signal from a special function unit of the output block 214 is input from an output port to an input port via an external cable as described above, the total output signal exceeds one line, and the system is no longer achieved.

Given the above, the image processing apparatus 200A shown in FIG. 19 is conceivable. In FIG. 19, identical reference numbers are given for portions corresponding to that shown in FIG. 18. In the image processor 201A of the image processing apparatus 200A, there is provided a reentry path 216 for routing an output signal from a special function unit of the output block 214 as a reentry input before that output signal is one line-delayed. However, the image processing apparatus 200A shown in FIG. 19 involves providing additional internal wiring in the image processor 201A for the reentry path 216, and also has the disadvantage of a decrease in the allocation of external inputs in the matrix switcher 212.

Meanwhile, the image processing apparatus 200B shown in FIG. 20 is also conceivable. In FIG. 20, identical reference numbers are given for portions corresponding to that shown in FIG. 19. In the image processor 201B of the image processing apparatus 200B, there is provided a reentry path 216 for routing an output signal from a special function unit of the output block 214 as a reentry input before that output signal is one line-delayed, as well as a switch circuit 217 for switching between the reentry input and an external input. In the image processing apparatus 200B shown in FIG. 20, the allocation of external inputs in the matrix switcher 212 is not decreased, but the image processing apparatus 200B does involve additional internal wiring in the image processor 201B for the reentry path 216, as well as the switch circuit 217.

It is thus desirable to enable usage of particular function units of the output block upstream to the internal signal processing path, without modifying the hardware configuration.

An image processing apparatus in accordance with an embodiment of the present invention includes an image processor, an external reentry settings unit, and a reentry stage information generator. The image processor includes: a matrix switcher having a plurality of input lines arranged in one direction, a plurality of output lines arranged in another direction and intersecting the input lines, and a plurality of crosspoint switches, which connect the input lines to the output lines at each crosspoint where the input lines and the output lines intersect; a signal processing block, connected to a portion of the output lines of the matrix switcher on the upstream side, and connected to a portion of the input lines of the matrix switcher by reentry paths on the downstream side thereof; and an output block, connected to a portion of the output lines of the matrix switcher on the upstream side thereof. The external reentry settings unit is configured to set a first port selected from the plurality of output ports in the matrix switcher as an external reentry output port, and to set a second port selected from the plurality of input ports in the matrix switcher as an external reentry output port. The reentry stage information generator is configured to use connection settings information for each crosspoint of the matrix switcher as well as the settings information of the external reentry settings unit as a basis for generating reentry stage information, which indicates the stage of the internal signal processing path where a special function unit is logically positioned, and wherein the special function unit corresponds to the external reentry output ports of the signal processing block and the output block.

In the image processor in accordance with an embodiment of the present invention, the output port corresponding to the special function unit of the output block (i.e., the first port) is connected to a predetermined input port (i.e., the second port) via an external cable. In so doing, it becomes possible to use the special function unit on the upstream side of the internal signal processing path. The special function unit herein may be a downstream keyer, for example.

In order to use the special function unit on the upstream side of the internal signal processing path, the external reentry settings unit sets the first port as an external reentry output port, and sets the second port as an external reentry input port. As a result of these settings, the special function unit of the output block is treated in the same manner as a signal processing block.

In other words, as a result of the reentry stage information generator, reentry stage information is generated, which indicates the stages of the internal signal processing path where one or more signal processing block and a special function unit of the output block are logically positioned. The reentry stage information is generated on the basis of connection settings information for each crosspoint in the matrix switcher, as well as settings information from the external reentry settings unit. In this case, the maximum value of reentry stages for all signals to be used by a signal processing block or the special function unit is used as a basis for determining the stages of the internal signal processing path where the one or more signal processing blocks and the special function unit of the output block are logically positioned, for example. Additionally, on the basis of the reentry settings information, a phase controller controls the phases of the signal processing and output from the one or more signal processing blocks and the special function unit of the output block.

As described above, in an embodiment of the present invention, an output port corresponding to a special function unit of an output block (i.e., a first port) is connected to a predetermined input port (i.e., a second port) via an external cable. When such a connection is made, the special function unit of the output block is treated in the same manner as a signal processing block, on the basis of the corresponding external reentry input/output port settings. Consequently, the special function unit of the output block becomes usable on the upstream side of the internal signal processing path, without modifying the hardware configuration of the image processor.

According to an embodiment of the present invention, an output port corresponding to a special function unit of an output block (i.e., a first port) may be connected to a predetermined input port (i.e., a second port) via an external cable, in order to use the special function unit on the upstream side of the internal signal processing path. When such a connection is made, external reentry input/output port settings corresponding to that connection are set, and the special function unit of the output block is treated in the same manner as a signal processing block. Consequently, the special function unit of the output block becomes usable on the upstream side of the internal signal processing path, without modifying the hardware configuration of the image processor.

BRIEF DESCRIPTION OF THE DRAWINGS

FIG. 3 illustrates an exemplary external reentry settings screen displayed on a display;

FIG. 19 is a block diagram illustrating another exemplary configuration of an image processing apparatus; and FIG. 20 is a block diagram illustrating another exemplary configuration of an image processing apparatus.

DESCRIPTION OF THE PREFERRED EMBODIMENTS

Hereinafter, an embodiment for carrying out the invention (hereinafter referred to as the embodiment) will be described. The description will proceed as follows.

1. Embodiment
2. Modification

<1. Embodiment>

[Configuration of Image Processing Apparatus]

Figure 1:
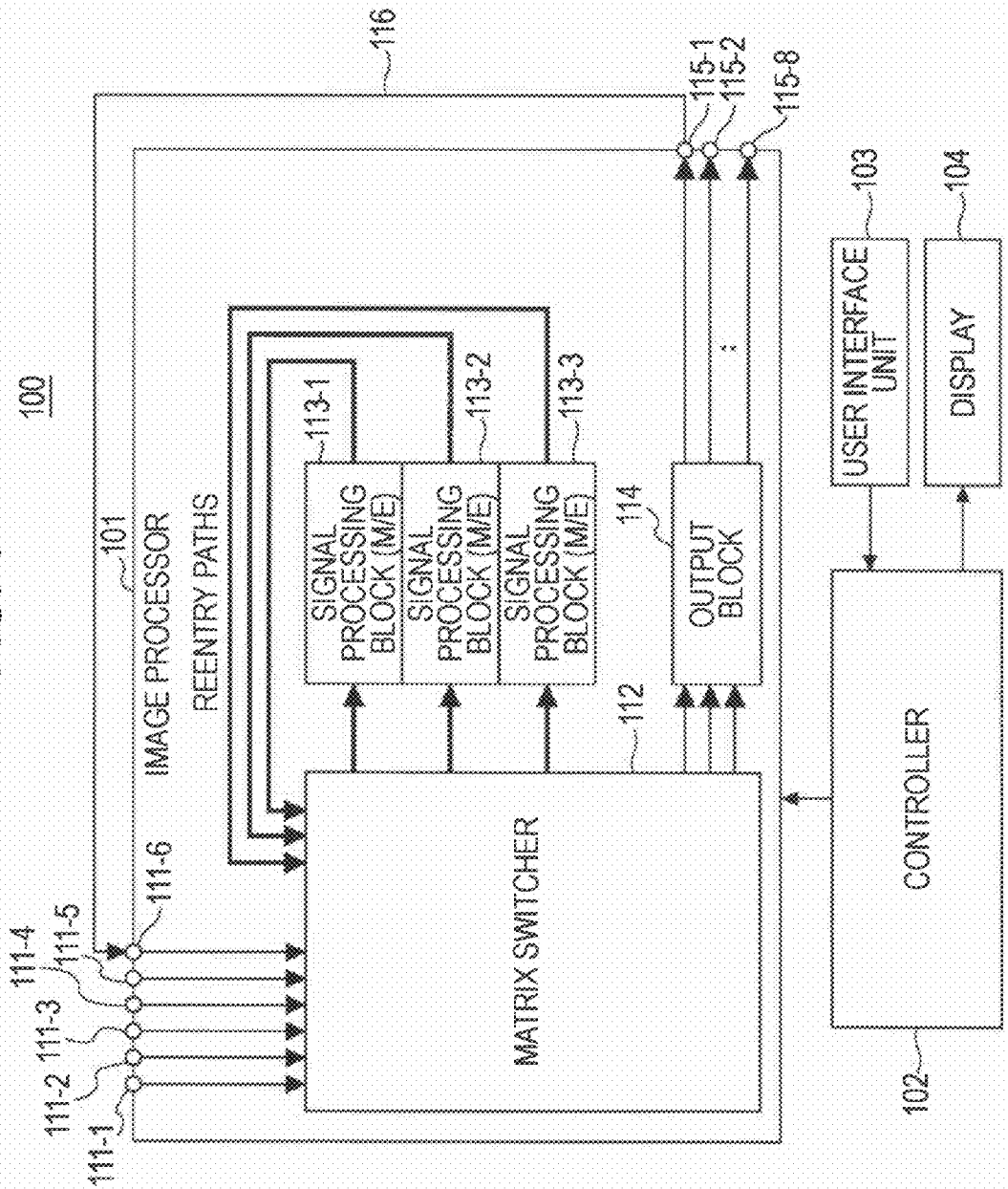
FIG. 1 is a block diagram illustrating an exemplary configuration of an image processing apparatus in accordance with an embodiment of the present invention.

FIG. 1 illustrates an exemplary configuration of an image processing apparatus 100 in accordance with an embodiment of the present invention. The image processing apparatus 100 includes an image processor 101, a controller 102, a user interface unit 103, and a display 104.

The controller 102 controls the operation of the image processor 101. The user interface unit 103 and the display 104 together constitute a user interface, and are connected to the controller 102. In addition, the image processor 101 includes input ports 111-1 to 111-6, a matrix switcher 112, signal processing blocks (i.e., Mix/Effects (M/E) blocks) 113-1 to 113-3, an output block 114, and output ports 115-1 to 115-8.

The input ports 111-1 to 111-6 are ports for inputting image signals (i.e., footage) from external equipment. Herein, the external equipment may be players for footage playback, text generators, or CG apparatus, for example. The output ports 115-1 to 115-8 are ports for outputting image signals to external equipment. The signal processing blocks 113-1 to 113-3 process signals for processes such as keying and wiping, for example. The output block 114 performs phase alignment (i.e., one line-delay) and adapts signals to a signal standard, while also processing signals for output.

The matrix switcher 112 supplies selected signals to the internal signal processing blocks and the output block. The signals are selected from among the reentry inputs from the external inputs and the internal signal processing blocks. Although not shown in the drawings, the matrix switcher 112 herein is realized by a plurality of input lines arranged in one direction, a plurality of output lines arranged in another direction and intersecting the input lines, and a plurality of crosspoint switches, which connect the input lines to the output lines at each crosspoint where the input lines and the output lines intersect.

The input ports 111-1 to 111-6 are connected to a portion of the input lines of the matrix switcher 112. In addition, the upstream sides of the signal processing blocks 113-1 to 113-3 are connected to a portion of the output lines of the matrix switcher 112, while the downstream sides are connected to a portion of the input lines of the matrix switcher 112 via reentry paths. In addition, the upstream side of the output block 114 is connected to a portion of the output lines of the matrix switcher 112, while the output ports 115-1 to 115-8 lead from the downstream side.

[Output Signal Reentry Using External Connection]

Output signal reentry using external connection in the image processing apparatus 100 shown in FIG. 1 will now be described. When a special function unit of the output block 114 in the image processor 101 is to be used on the upstream side of the internal signal processing path in the image processing apparatus 100, the user connects a first port to a second port using an external cable 116.

Herein, the first port is one of the output ports 115-1 to 115-8, from which the output signal of the special function unit of the output block 114 is output. The second port is an input port connected to an input line of the matrix switcher 112, which inputs the output signal of the special function unit output by the first port as reentry input.

Figure 2:
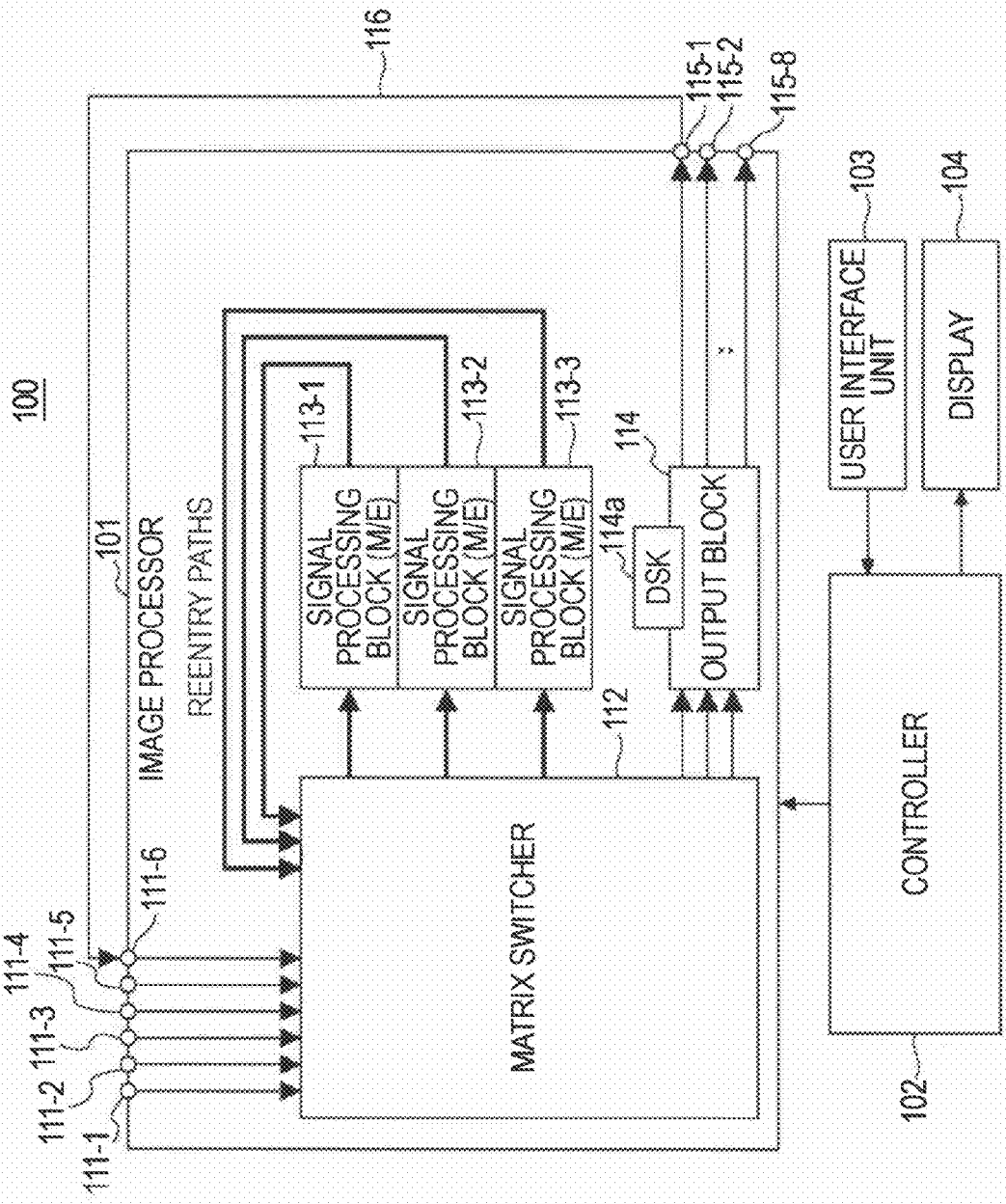
FIG. 2 illustrates an exemplary special function unit of an output block.

In the cable connection example shown in FIG. 1, the first port is the output port 115-1, while the second port is the input port 111-6. The special function unit of the output block 114 is herein taken to be a downstream keyer (DSK) 114a, as shown by way of example in FIG. 2. The DSK 114a keys text to an input image, and outputs the result. In the cable connection example shown in FIG. 1, there is just one combination of a first port and a second port connected by a cable. However, if there are a plurality of special function units in the output block 114 desired for use on the upstream side of the internal signal processing path, then there may be a plurality of such combinations of connected ports.

In the image processing apparatus 100 shown in FIG. 1, it is possible for the user to operate the user interface unit 103 and set up external reentry with respect to the cable connection described above. For each combination in such external reentry setup, the first port is set as the external reentry output port, while the second port is set as the external reentry input port. Doing so clearly defines which outputs are returned to particular inputs. Herein, the user interface unit 103 is configured to include an external reentry setup unit.

FIG. 3 illustrates one example of an external reentry settings screen displayed on the display 104. For each output, the user sets the reentry input if that output is to be looped back, or sets N/A (Not Available) if that output is not to be looped back. The example shown in FIG. 3 illustrates external reentry settings corresponding to the connection state shown in FIG. 1, wherein input 6 (IN-6) is set as the reentry input for output 1 (OUT-1), and wherein N/A is set for the outputs 2 to 8 (OUT-2 to OUT-8).

Herein, the external reentry setup described above may also be configured to run automatically. In this case, a detector or similar means is provided in order to mechanically or electrically detect a connection made between one of the output ports 115-1 to 115-8 and one of the input ports 111-1 to 111-6 using an external cable 116.

[Phase Control for the Signal Processing Blocks and the Special Function Unit of the Output Block]

In order to control the phase of the signal processing and output from the signal processing blocks 113-1 to 113-3 as well as the special function unit of the output block 114, the controller 102 generates reentry stage information, which indicates the stage of the internal signal processing path where each of the above blocks is logically positioned. The controller 102 generates the reentry stage information on the basis of connection settings information for each crosspoint in the matrix switcher 112, the external reentry settings information described earlier, and internal reentry information.

Herein, the connection settings at each crosspoint are determined by the type of composite image to be created from a plurality of sources, as well as by the compositing order. The connection or non-connection of individual crosspoints in the matrix switcher 112 is controlled by the controller 102 on the basis of such connection settings information.

In addition, on the basis of the generated reentry stage information, the controller 102 sets the phase of the signal processing and output from the signal processing blocks 113-1 to 113-3 and the special function unit of the output block 114. In other words, the phase of the signal processing and output from each of the signal processing blocks 113-1 to 113-3 as well as the special function unit of the output block 114 is set to a different phase, according to the stage of the internal signal processing path where each block is logically positioned. Herein, the controller 102 is thus configured to include a reentry information generator and a phase controller.

Figure 4:
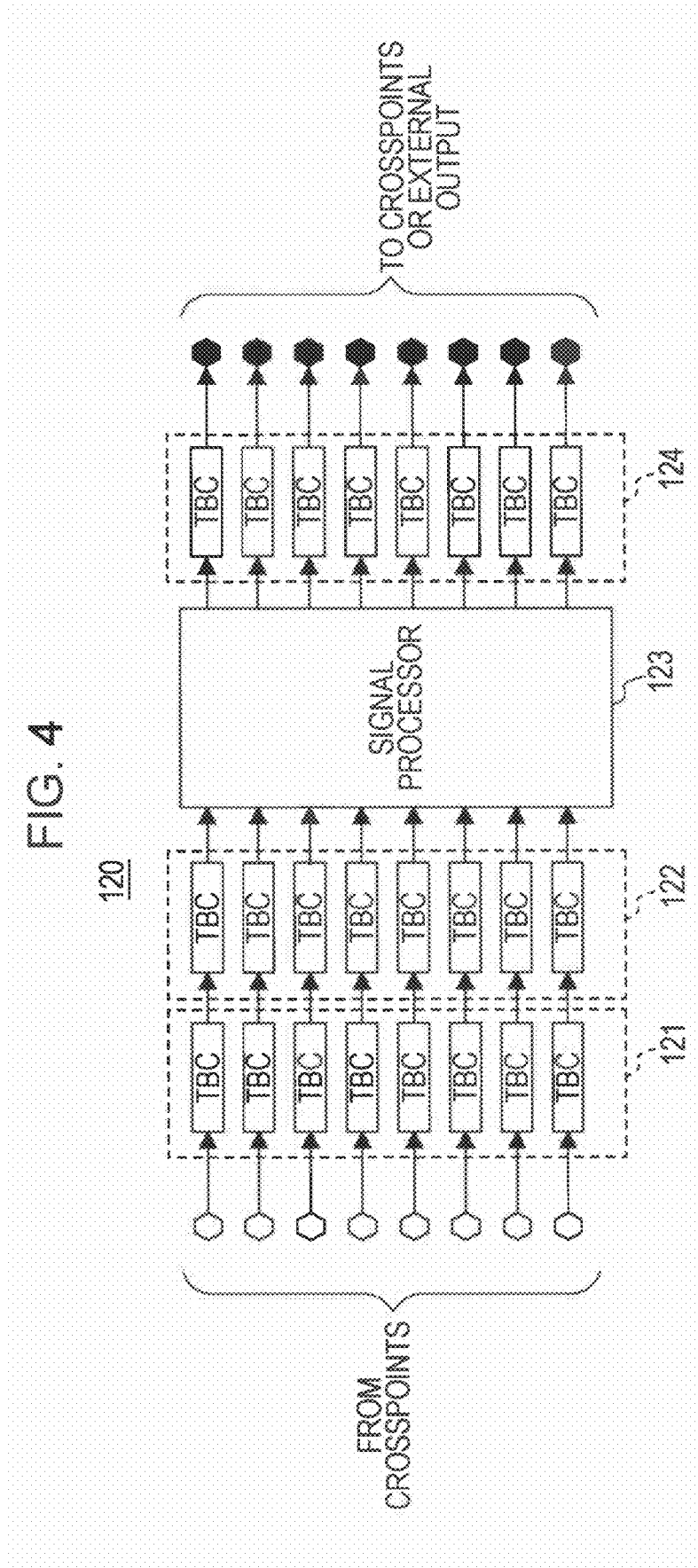
FIG. 4 is a block diagram illustrating an exemplary configuration of the signal processing blocks and the output block.

FIG. 4 illustrates an exemplary configuration of a signal processing block 120 (i.e., one of the signal processing blocks 113-1 to 113-3, or the output block 114). The signal processing block 120 includes a signal processor 123, as well as time-based corrector (TBC) groups 121, 122, and 124. Each TBC group includes one TBC for each individual input. The signal processing block 120 conducts phase control by means of the second-stage TBCs on the upstream side, as well as the first-stage TBCs on the downstream side. The second-stage TBCs on the upstream side are used to align the phases of external input signals and reentry signals. Herein, each TBC is a phase-shifter circuit using line (FIFO) memory.

The TBC group 121 is the first-stage TBC group, positioned upstream to the signal processor 123. The crosspoint-selected signals corresponding to each TBC in this first-stage TBC group 121 have had their readout positions set differently due to various factors. By means of the first-stage TBC group 121, the crosspoint-selected external input signals are phase-aligned, while in addition, the reentry signals are also phase-aligned.

The TBC group 122 is the second-stage TBC group, positioned upstream to the signal processor 123. The output phase of each TBC in the first-stage TBC group 121 differs, depending on whether the output is an external input signal or a reentry signal. In order to perform compositing and other signal processing in the signal processor 123, all signals should be phase-aligned. By means of the second-stage TBC group 122, the external input signals and reentry signals output from the first-stage TBC group 121 are phase-aligned. The readout position (i.e., the delay amount) for each TBC in the second-stage TBC group 122 is set according to the stage in the internal signal processing path where the signal processing block 120 is logically positioned.

The TBC group 124 is the TBC group positioned downstream to the signal processor 123. Among the output signals from each TBC of the TBC group 124, the reentry signals have an output phase that is linked to the output phase of the second-stage TBC group 122. Furthermore, the output signals from respective TBCs of the TBC group 124 that are to be externally output have an output phase that is fixed having a one line-delay. The TBC group 124 herein may also be omitted from the signal processing blocks 113-1 to 113-3.

A phase control processing sequence in the controller (i.e., CPU) 102 will now be described on the basis of the flowchart shown in FIG. 5. In step ST1, the controller 102 starts the phase control process each time a vertical sync signal (i.e., a trigger signal) is input, for example. In other words, the controller 102 controls the phase of the signal processing and output with respect to the signal processing blocks 113-1 to 113-3 and the special function unit of the output block 114 for each field, or alternatively, for each frame.

In step ST2, the controller 102 acquires the connection settings information for each crosspoint in the matrix switcher 112. Such settings information is acquired from a register, memory, or other component where the information is stored. Subsequently, in step ST3, the controller 102 performs a loop lock process. This lock process is conducted on the basis of the connection settings information for each crosspoint, as well as on the basis of external reentry settings information and internal reentry information. For example, when given a particular state of connection settings for each crosspoint, if a loop is formed in the internal signal processing path as a result of the user performing a given crosspoint connection operation, then the controller 102 treats that connection operation as invalid, and subsequently performs the following processing.

Next, in step ST4, the controller 102 generates reentry stage information, which indicates the stages of the internal signal processing path where each of the signal processing blocks 113-1 to 113-3 as well as the special function unit of the output block 114 are logically positioned. In this case, as described earlier, the controller 102 generates the reentry stage information on the basis of the connection settings information for each crosspoint in the matrix switcher 112, the external reentry settings information described earlier, as well as internal reentry information.

At this point, the controller 102 determines the stage for each of the signal processing blocks 113-1 to 113-3 as well as the special function unit of the output block 114 by using the maximum value of reentry stages for all signals to be used.

Next, in step ST5, the controller 102 uses the reentry stage information generated in step ST4 as a basis for controlling the phase of the signal processing blocks 113-1 to 113-3 as well as the special function unit of the output block 114. In this case, the phases of the signal processing and output from each of the signal processing blocks 113-1 to 113-3 and the special function unit of the output block 114 are made to differ according to the stages of the internal signal processing path where each block is logically positioned.

After the processing in step ST5, in step ST6 the controller 102 ends the series of phase control processing.

Figure 5:
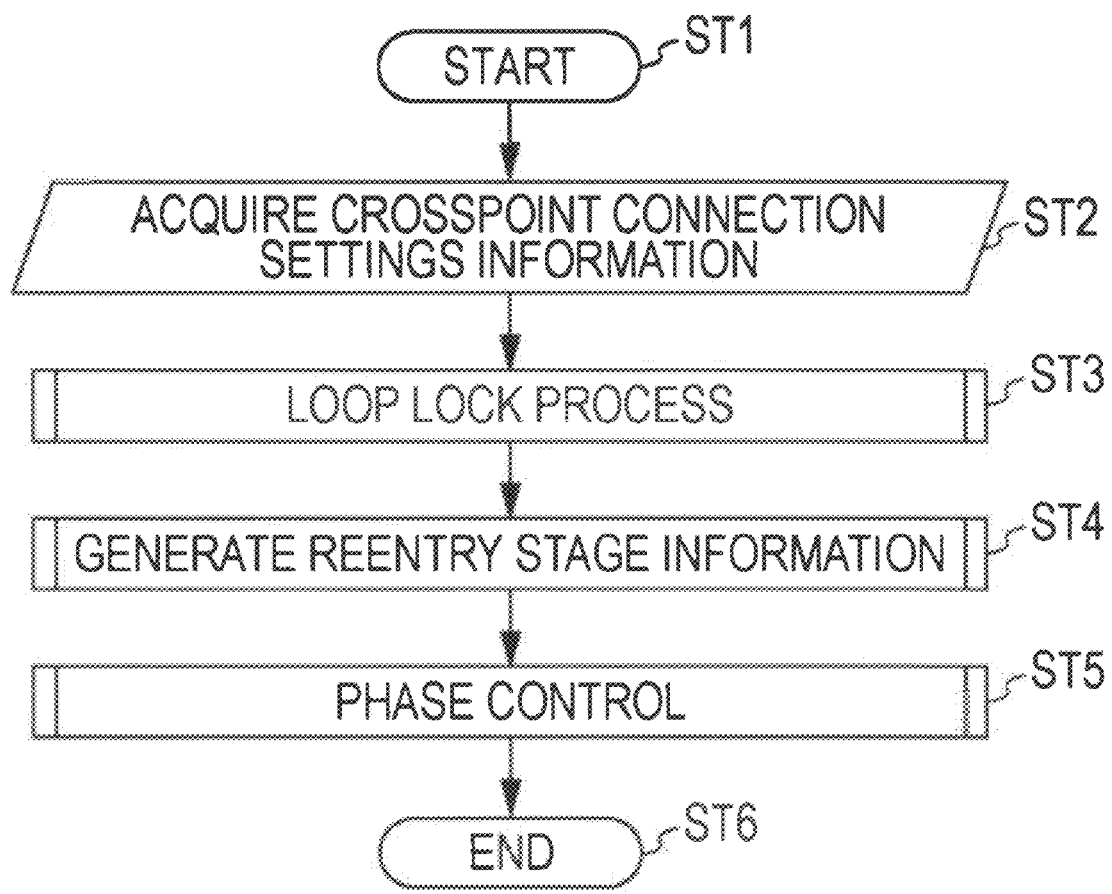
FIG. 5 is a flowchart for explaining a phase control processing sequence in a controller (i.e., CPU)
Figure 6:
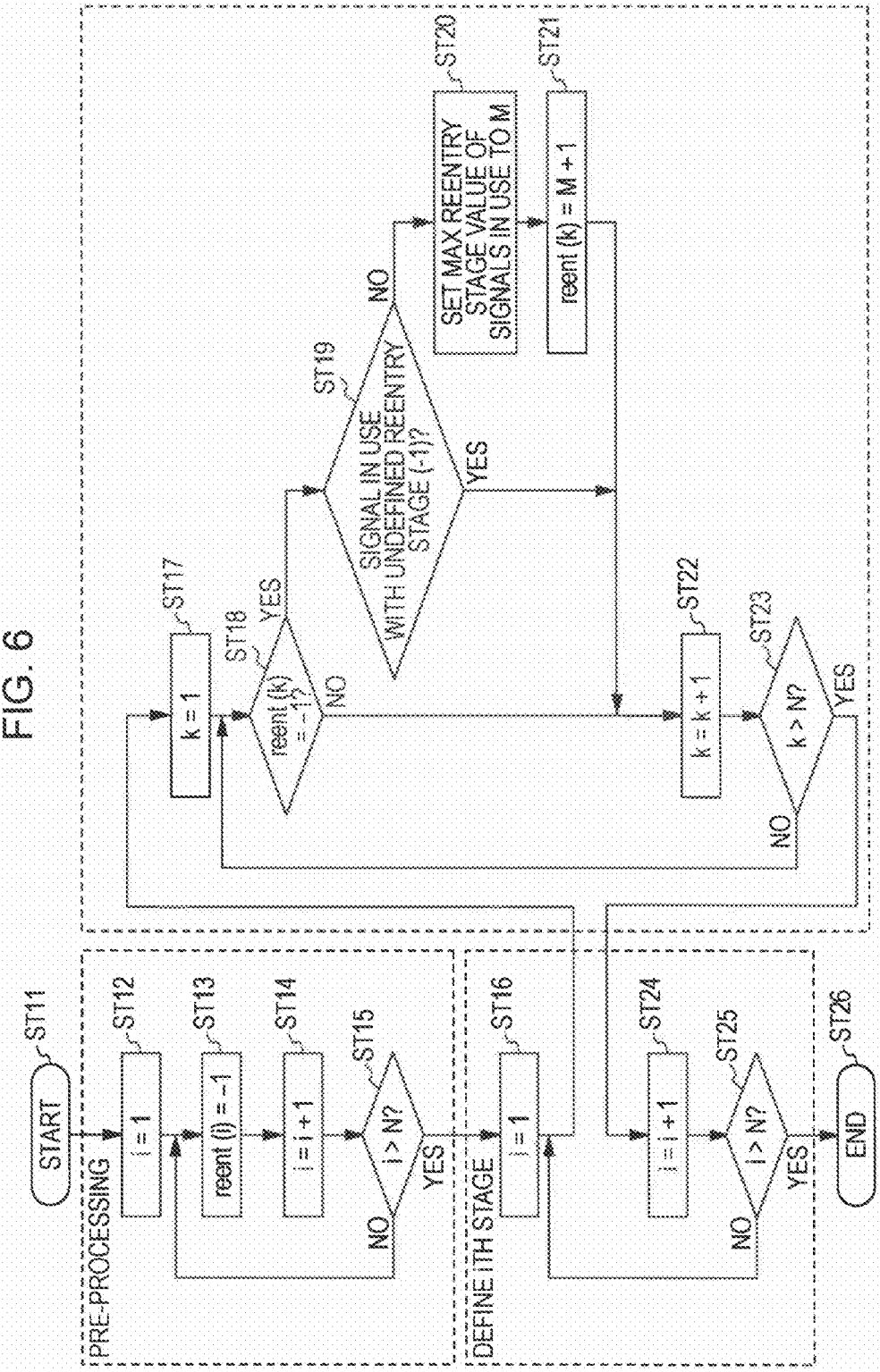
FIG. 6 is a flowchart for explaining a process in a controller for generating reentry stage information.

The flowchart in FIG. 6 illustrates a process for generating reentry stage information in the controller 102 (i.e., the processing in step ST4 of FIG. 5).

In step ST11, the controller 102 starts the process for generating reentry stage information, and then transitions to the processing in step ST12. In step ST12, the controller 102 sets i=1, and then transitions to the processing in step ST13.

In step ST13, the controller 102 sets reent(i)=−1. Subsequently, in step ST14, the controller 102 increments i, and then transitions to the processing in step ST15. In step ST15, the controller 102 checks whether or not i>N. In other words, the controller 102 determines whether or not pre-processing has finished for the N signal processing blocks (if there is external reentry, then the special function unit of the output block is also included).

When i>N is false, the controller 102 determines that processing has not yet finished for all signal processing blocks, returns to step ST13, and transitions to the next signal processing block. In contrast, when i>N is true, the controller 102 determines that processing for all signal processing blocks has finished, and transitions to the processing in step ST16.

By means of the pre-processing in steps ST12 to ST15, the controller 102 sets the respective reentry stage information reent(i) (where i=1, 2, . . . , N) for the N signal processing blocks to −1, which indicates an undefined state.

Next, in step ST16, the controller 102 sets i=1. The controller 102 then transitions to processing to define the ith stage of the internal signal processing path. In step ST17, the controller 102 sets k=1, and then transitions to the processing in step ST18.

In step ST18, the controller 102 checks whether or not reent(k)=−1. In other words, the controller 102 determines whether or not the reentry stage number of the kth signal processing block is undefined. When reent(k)=−1 is true (i.e., when the reentry stage number of the kth signal processing block is in an undefined state), the controller 102 determines in step ST19 whether or not a signal currently in use has an undefined reentry stage number. Herein, external input is taken to have a reentry stage number of 0.

If there is no signal in an undefined state, then in step ST20 the controller 102 sets the maximum value of reentry stage numbers for the signals in use to M. Subsequently, in step ST21, the controller 102 sets reent(k)=M+1, and then transitions to the processing in step ST22. Herein, when reent(k) =−1 is false in step ST18, and when a signal in an undefined state exists in step ST19, the controller 102 immediately transitions to the processing in step ST22.

In step ST22, the controller 102 increments k, and then transitions to the processing in step ST23. In the processing in step ST23, the controller 102 checks whether or not k>N. In other words, the controller 102 determines whether or not processing has finished for the N signal processing blocks (if there is external reentry, then the special function unit of the output block is also included).

When k>N is false, the controller 102 determines that processing has not finished for all signal processing blocks, returns to step ST18, and transitions to the next signal processing block. In contrast, when k>N is true, the controller 102 determines that processing has finished for all signal processing blocks, and transitions to the processing in step ST24.

In step ST24, the controller 102 increments i, and then transitions to the processing in step ST25. In step ST25, the controller 102 checks whether or not i>N. In other words, the controller 102 determines whether or not all stage determining processing up to the Nth stage has finished.

When i>N is false, the controller 102 determines that not all stage determining processing has finished, returns to step ST17, and transitions to the determining processing for the next stage. In contrast, when i>N is true, the controller 102 determines that determining processing has finished for all stages, and in step ST26, ends the process.

In the process for generating reentry stage information according to the flowchart shown in FIG. 6, the reentry stage numbers of N signal processing blocks determined by the maximum reentry stage number value M for all signals in use. Furthermore, the reentry stage numbers of the N signal processing blocks are sequentially determined from the first stage where an undefined reentry signal is not in use.

Figure 7:
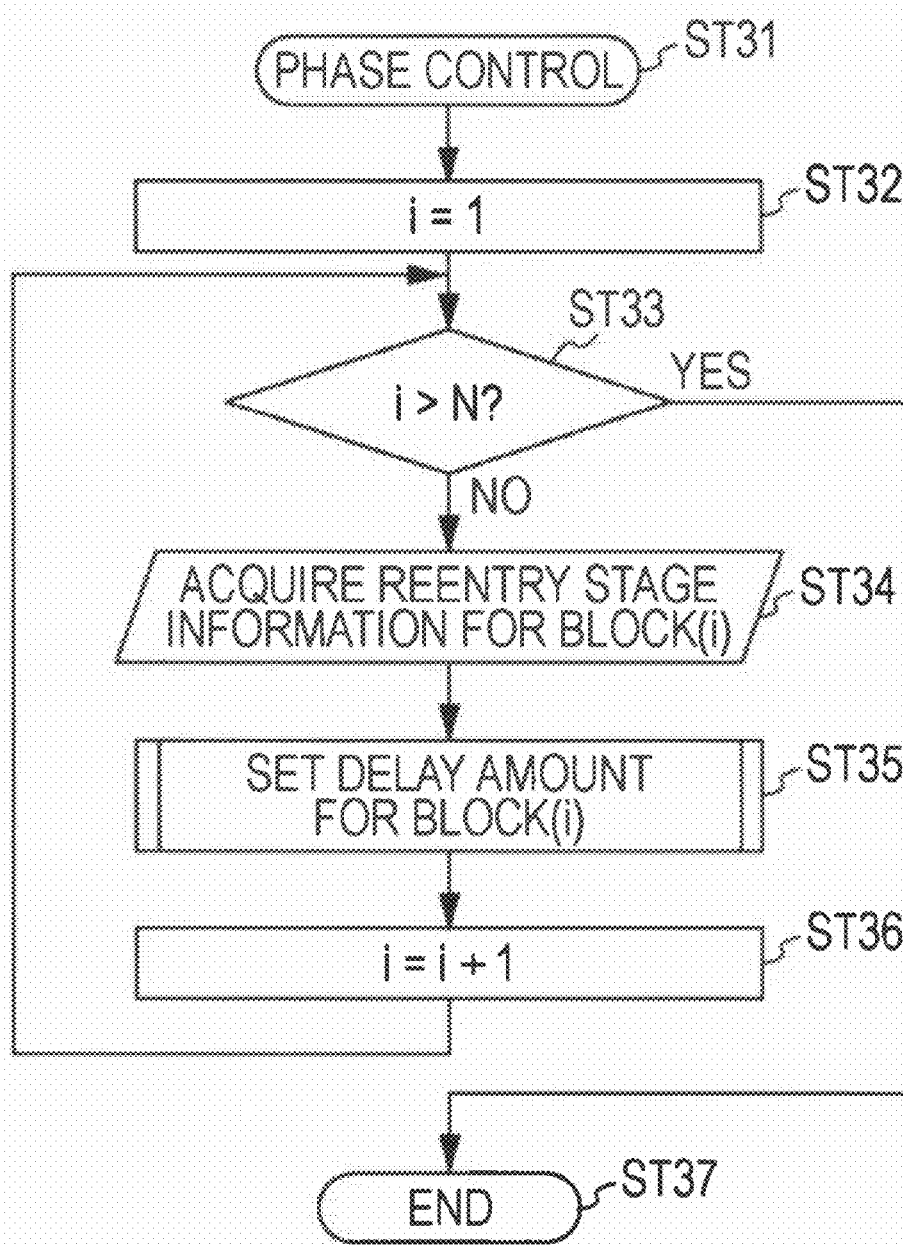
FIG. 7 is a flowchart for explaining a phase control process in a controller.

The flowchart in FIG. 7 illustrates a phase control process executed by the controller 102 (i.e., the processing in step ST5 of FIG. 5).

In step ST31, the controller 102 starts the process, and subsequently transitions to step ST32. In step ST32, the controller 102 increments i, and then transitions to step ST33.

In step ST33, the controller 102 checks whether or not i>N. In other words, the controller 102 determines whether or not delay settings have been set for the N signal processing blocks (if there is external reentry, then the special function unit of the output block is also included).

When i>N is false, the controller 102 determines that delay settings have not been set for all signal processing blocks, and transitions to the processing in step ST34. In step ST34, the controller 102 acquires the reentry stage information for Block(i). Such reentry stage information may be stored in internal memory of the controller 102, for example.

Next, in step ST35, the controller 102 uses the reentry stage information acquired in step ST34 as a basis for setting delay settings for Block(i). More specifically, the controller 102 uniquely sets a delay amount in each TBC according to the stage of the internal signal processing path where the current Block(i) is logically positioned.

Next, in step ST36, the controller 102 increments i, and then returns to step ST33 and transitions to the processing for setting delay settings for the next block. When i>N is true in step ST33, the controller 102 determines that delay settings have been set for all blocks, and in step ST37, ends the process.

[Exemplary Phase Control in the Case of No External Reentry]

Figure 8:
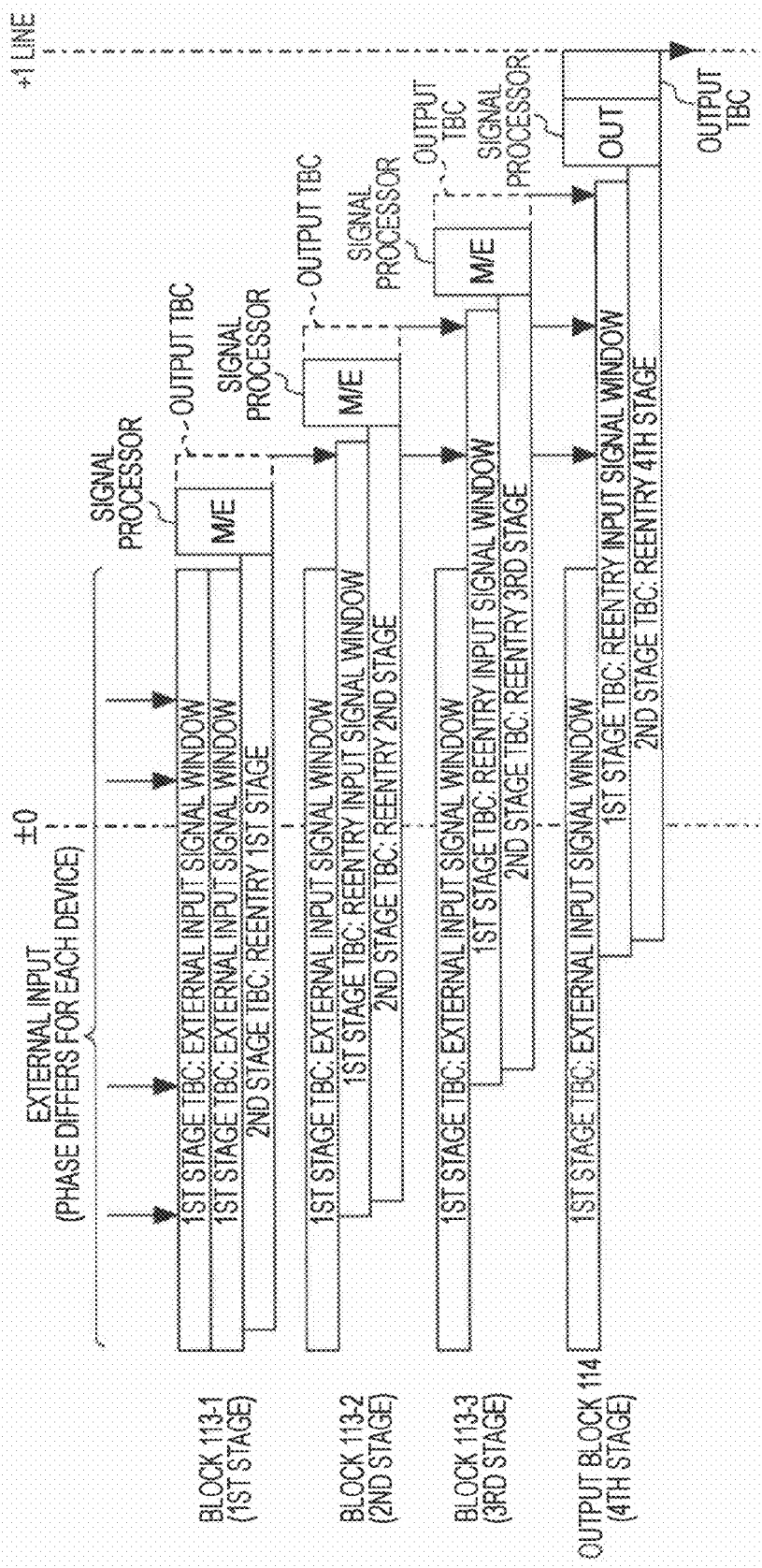
FIG. 8 illustrates exemplary phase control in the case where there is no external reentry by connecting input/output ports using an external cable.

FIG. 8 illustrates exemplary phase control in the case where there is no external reentry by connecting input/output ports using an external cable 116. In this phase control example, the signal processing blocks 113-1, 113-2, and 113-3 are logically positioned at the first, second, and third stages of the internal signal processing path, respectively, while the output block 114 is logically positioned at the fourth stage of the internal signal processing path.

In this case, in the first-stage signal processing block 113-1, external input signals input into the upstream first-stage TBCs within an external input signal window are first phase-aligned, and are then input into the signal processor 123 via the upstream second-stage TBCs. Subsequently, the processed signals pass through the downstream TBCs and become reentry input signals for use in the second-stage signal processing block 113-2.

In the second-stage signal processing block 113-2, external input signals input into the upstream first-stage TBCs within the external input signal window are first phase-aligned, and are then input into the upstream second-stage TBCs. Additionally, in the second-stage signal processing block 113-2, reentry input signals input into the upstream first-stage TBCs within the reentry input signal window are first phase-aligned, and are then input into the upstream second-stage TBCs.

In this case, in order to use the reentry input signals from the first-stage signal processing block 113-1, the reentry input signal window of the upstream first-stage TBCs is delayed by the external input signal window of the upstream first-stage TBCs in the second-stage signal processing block 113-2. For this reason, in the second-stage signal processing block 113-2, the outputs of the upstream first-stage TBCs differ in phase, depending on whether the output signal is an external input signal or a reentry input signal.

The external input signals and reentry input signals, being output by the upstream first-stage TBCs and differing in phase as described above, are then phase-aligned by the upstream second-stage TBCs, and are then input into the signal processor 123. Subsequently, the processed signals pass through the downstream TBCs and become reentry input signals for use in the third-stage signal processing block 113-3.

In the third-stage signal processing block 113-3, external input signals input into the upstream first-stage TBCs within the external input signal window are first phase-aligned, and are then input into the upstream second-stage TBCs. Additionally, in the third-stage signal processing block 113-3, reentry input signals input into the upstream first-stage TBCs within the reentry input signal window are first phase-aligned, and are then input into the upstream second-stage TBCs.

In this case, in order to use the reentry input signals from the second-stage signal processing block 113-2, the reentry input signal window of the upstream first-stage TBCs is delayed by the external input signal window of the upstream first-stage TBCs in the third-stage signal processing block 113-3. For this reason, in the third-stage signal processing block 113-3, the outputs of the upstream first-stage TBCs differ in phase, depending on whether the output signal is an external input signal or a reentry input signal.

The external input signals and reentry input signals, being output by the upstream first-stage TBCs and differing in phase as described above, are then phase-aligned by the upstream second-stage TBCs, and are then input into the signal processor 123. Subsequently, the processed signals pass through the downstream TBCs and become reentry input signals for use in the fourth-stage output block 114.

In the fourth-stage output block 114, external input signals input into the upstream first-stage TBCs within the external input signal window are first phase-aligned, and are then input into the upstream second-stage TBCs. Additionally, in the fourth-stage output block 114, reentry input signals input into the upstream first-stage TBCs within the reentry input signal window are first phase-aligned, and are then input into the upstream second-stage TBCs.

In this case, in order to use the reentry input signals from the third-stage signal processing block 113-3, the reentry input signal window of the upstream first-stage TBCs is delayed by the external input signal window of the upstream first-stage TBCs in the fourth-stage output block 114. For this reason, in the fourth-stage output block 114, the outputs of the upstream first-stage TBCs differ in phase, depending on whether the output signal is an external input signal or a reentry input signal.

The external input signals and reentry input signals, being output by the upstream first-stage TBCs and differing in phase as described above, are then phase-aligned by the upstream second-stage TBCs, and are then input into the signal processor 123. Subsequently, the processed signals are output by the downstream TBCs with their output phases one line-delayed.

[Exemplary Phase Control in the Case of External Reentry]

Figure 9:
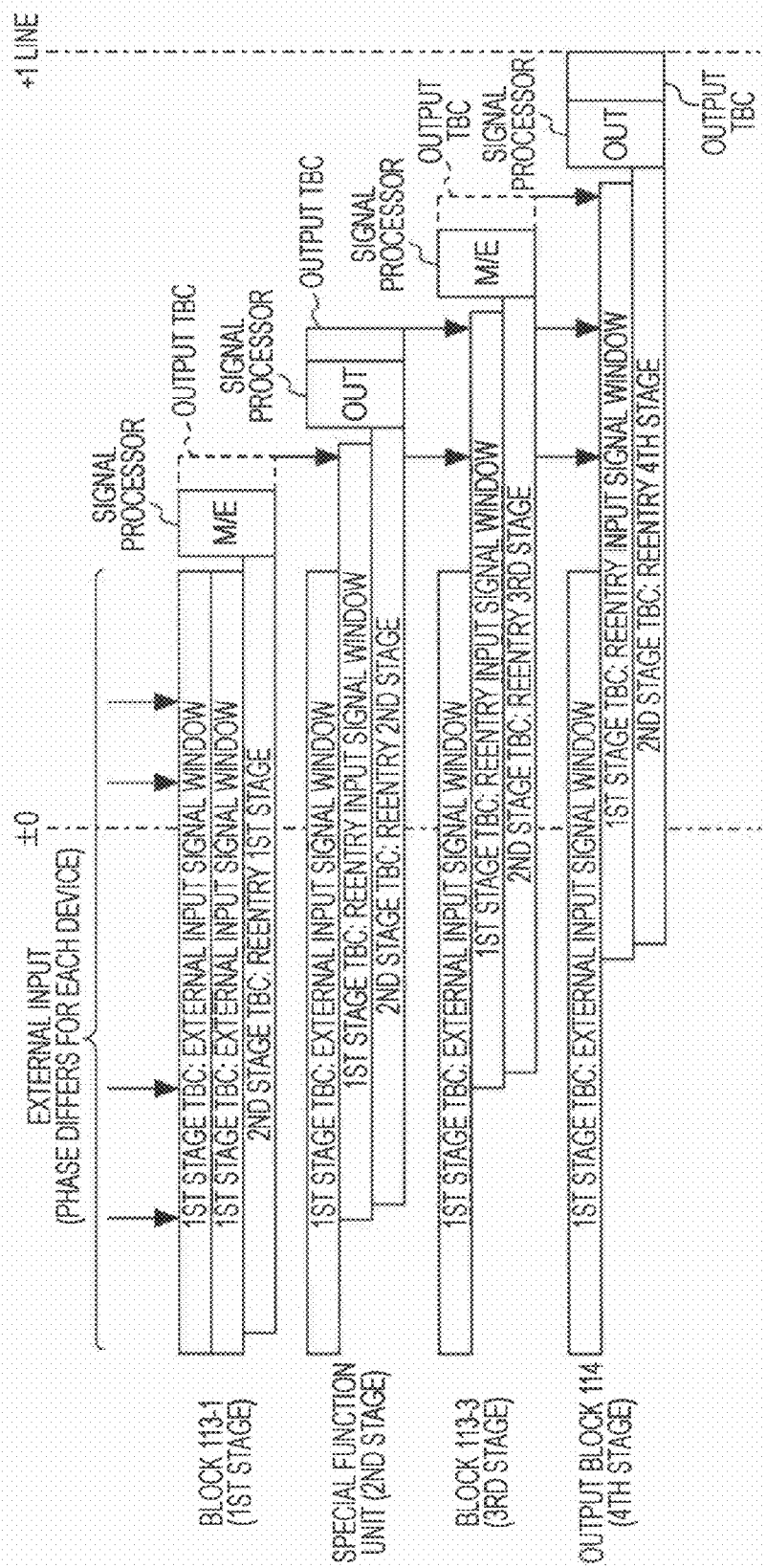
FIG. 9 illustrates exemplary phase control in the case where there is external reentry by connecting input/output ports using an external cable.

FIG. 9 illustrates exemplary phase control in the case where there is external reentry by connecting input/output ports using an external cable 116. In this phase control example, the signal processing block 113-1, the special function unit of the output block 114, and the signal processing block 113-3 are logically positioned at the first, second, and third stages of the internal signal processing path, respectively.

In this case, in the first-stage signal processing block 113-1, external input signals input into the upstream first-stage TBCs within the external input signal window are first phase-aligned, and are then input into the signal processor 123 via the upstream second-stage TBCs. Subsequently, the processed signals pass through the downstream TBCs and become reentry input signals for use in the second-stage special function unit.

In the second-stage special function unit, external input signals input into the upstream first-stage TBCs within the external input signal window are first phase-aligned, and are then input into the upstream second-stage TBCs. Additionally, in the second-stage special function unit, reentry input signals input into the upstream first-stage TBCs within the reentry input signal window are first phase-aligned, and are then input into the upstream second-stage TBCs.

In this case, in order to use the reentry input signals from the first-stage signal processing block 113-1, the reentry input signal window of the upstream first-stage TBCs is delayed by the external input signal window of the upstream first-stage TBCs in the second-stage special function unit. For this reason, in the second-stage special function unit, the outputs of the upstream first-stage TBCs differ in phase, depending on whether the output signal is an external input signal or a reentry input signal.

The external input signals and reentry input signals, being output by the upstream first-stage TBCs and differing in phase as described above, are then phase-aligned by the upstream second-stage TBCs, and are then input into the signal processor 123. Subsequently, the processed signals pass through the downstream TBCs and become reentry input signals for use in the third-stage signal processing block 113-3.

In the third-stage signal processing block 113-3, external input signals input into the upstream first-stage TBCs within the external input signal window are first phase-aligned, and are then input into the upstream second-stage TBCs. Additionally, in the third-stage signal processing block 113-3, reentry input signals input into the upstream first-stage TBCs within the reentry input signal window are first phase-aligned, and are then input into the upstream second-stage TBCs.

In this case, in order to use the reentry input signals from the second-stage special function unit, the reentry input signal window of the upstream first-stage TBCs is delayed by the external input signal window of the upstream first-stage TBCs in the third-stage signal processing block 113-3. For this reason, in the third-stage signal processing block 113-3, the outputs of the upstream first-stage TBCs differ in phase, depending on whether the output signal is an external input signal or a reentry input signal.

The external input signals and reentry input signals, being output by the upstream first-stage TBCs and differing in phase as described above, are then phase-aligned by the upstream second-stage TBCs, and are then input into the signal processor 123. Subsequently, the processed signals pass through the downstream TBCs and become reentry input signals for use in the fourth-stage output block 114 (excluding the special function unit described above).

In the fourth-stage output block 114, external input signals input into the upstream first-stage TBCs within the external input signal window are first phase-aligned, and are then input into the upstream second-stage TBCs. Additionally, in the fourth-stage output block 114, reentry input signals input into the upstream first-stage TBCs within the reentry input signal window are first phase-aligned, and are then input into the upstream second-stage TBCs.

In this case, in order to use the reentry input signals from the third-stage signal processing block 113-3, the reentry input signal window of the upstream first-stage TBCs is delayed by the external input signal window of the upstream first-stage TBCs in the fourth-stage output block 114. For this reason, in the fourth-stage output block 114, the outputs of the upstream first-stage TBCs differ in phase, depending on whether the output signal is an external input signal or a reentry input signal.

The external input signals and reentry input signals, being output by the upstream first-stage TBCs and differing in phase as described above, are then phase-aligned by the upstream second-stage TBCs, and are then input into the signal processor 123. Subsequently, the processed signals are output by the downstream TBCs with their output phases one line-delayed.

As described above, in the case where there is external reentry by connecting input/output ports using an external cable 116, phase control similar to that of the signal processing blocks 113-1 to 113-3 is conducted in the special function unit of the output block 114. In other words, the phase of the signal processing and output is dynamically controlled according to the stage of the internal signal processing path where the special function unit is logically positioned, with the processed signals being output earlier for acquisition by the next stage, and without being one line-delayed in the downstream TBCs.

[Specific Example of Image Processing]

Next a specific example of processing occurring in the image processor 101 of the image processing apparatus 100 shown in FIG. 1 will be described. In order to simplify explanation herein, it is assumed that in each signal processing block (including the output block), a single key signal is composited with a single background. Also, examples of using external reentry and not using external reentry are given herein. The case of using external reentry can be thought of as the case wherein a performance difference exists between the signal processing blocks and the output block, such that the performance of just the signal processing blocks is insufficient. As a result, it becomes desirable to use the special function unit of the output block on the upstream side of the signal processing path.

Figure 10:
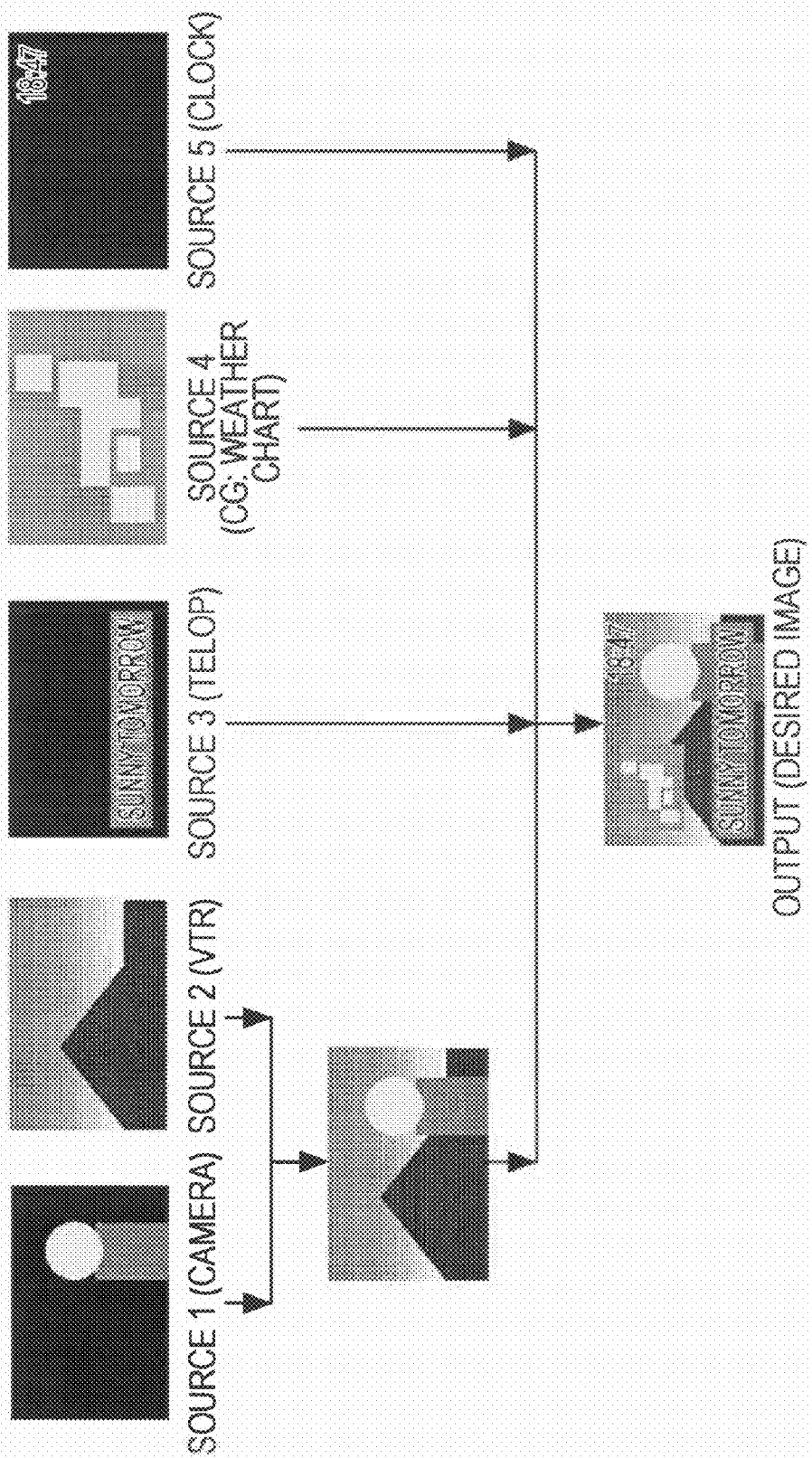
FIG. 10 illustrates a specific example of image compositing by an image processor.

FIG. 10 illustrates one example of image compositing. In this example, output images are obtained from a source 1 (camera), a source 2 (VTR), a source 3 (telop), a source 4 (CG: weather chart), and a source 5 (clock). When creating a single composite image from a plurality of sources, the compositing order can be freely set to some degree.

Figure 11:
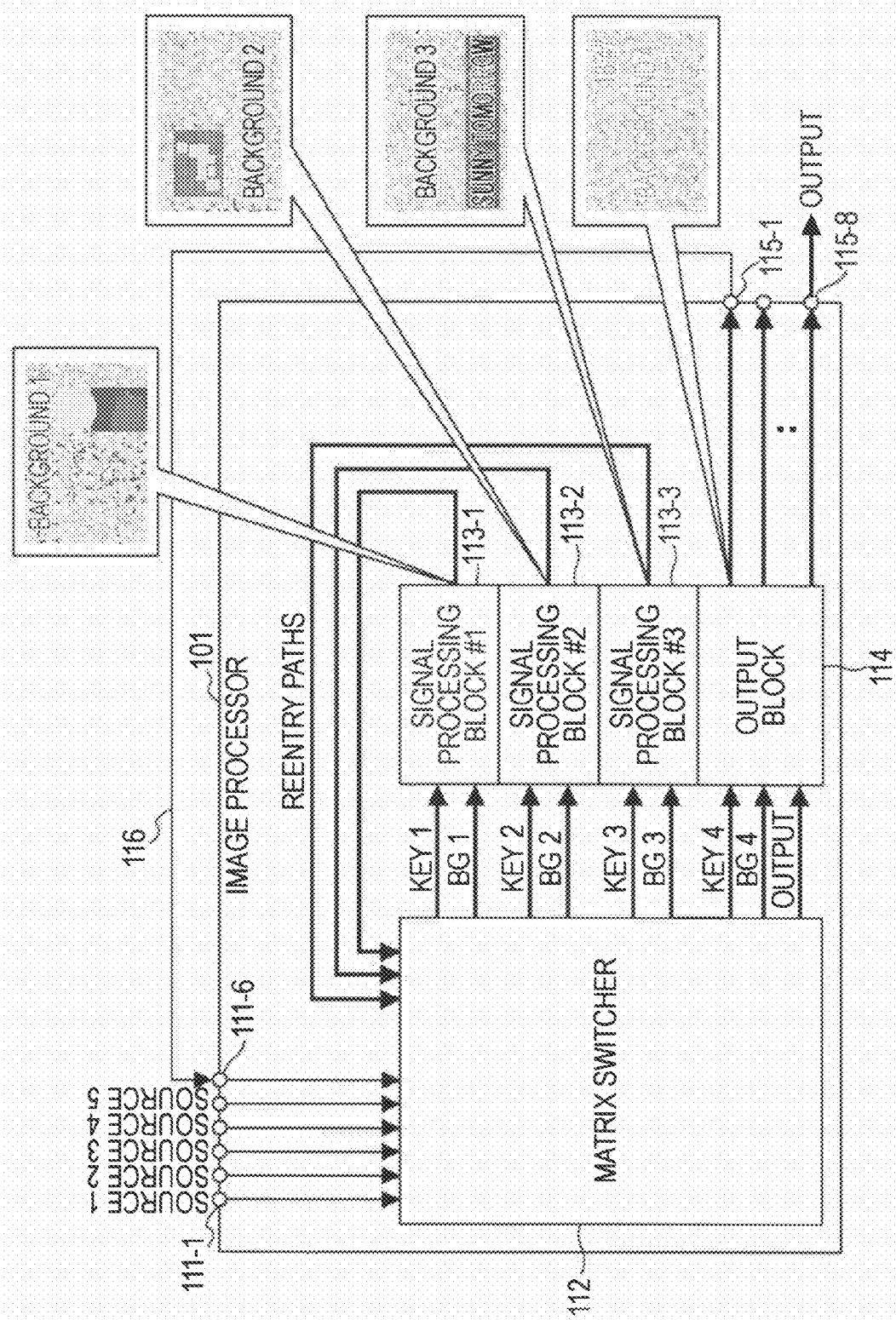
FIG. 11 illustrates the overall configuration when creating a composite image.

FIG. 11 illustrates the overall configuration when creating a composite image. In FIG. 11, identical reference numbers are used for portions corresponding to those shown in FIG. 1. The signal processing block #1 (i.e., the signal processing block 113-1) composites a key 1 onto a background 1 using chroma keying. The signal processing block #2 (i.e., the signal processing block 113-2) reduces a key 2, and composites key 2 onto a background 2 using picture-in-picture (PinP). The signal processing block #3 (i.e., the signal processing block 113-3) composites a key 3 onto a background 3. The output block (i.e., the output block 114) composites a key 4 onto a background 4.

Figure 12:
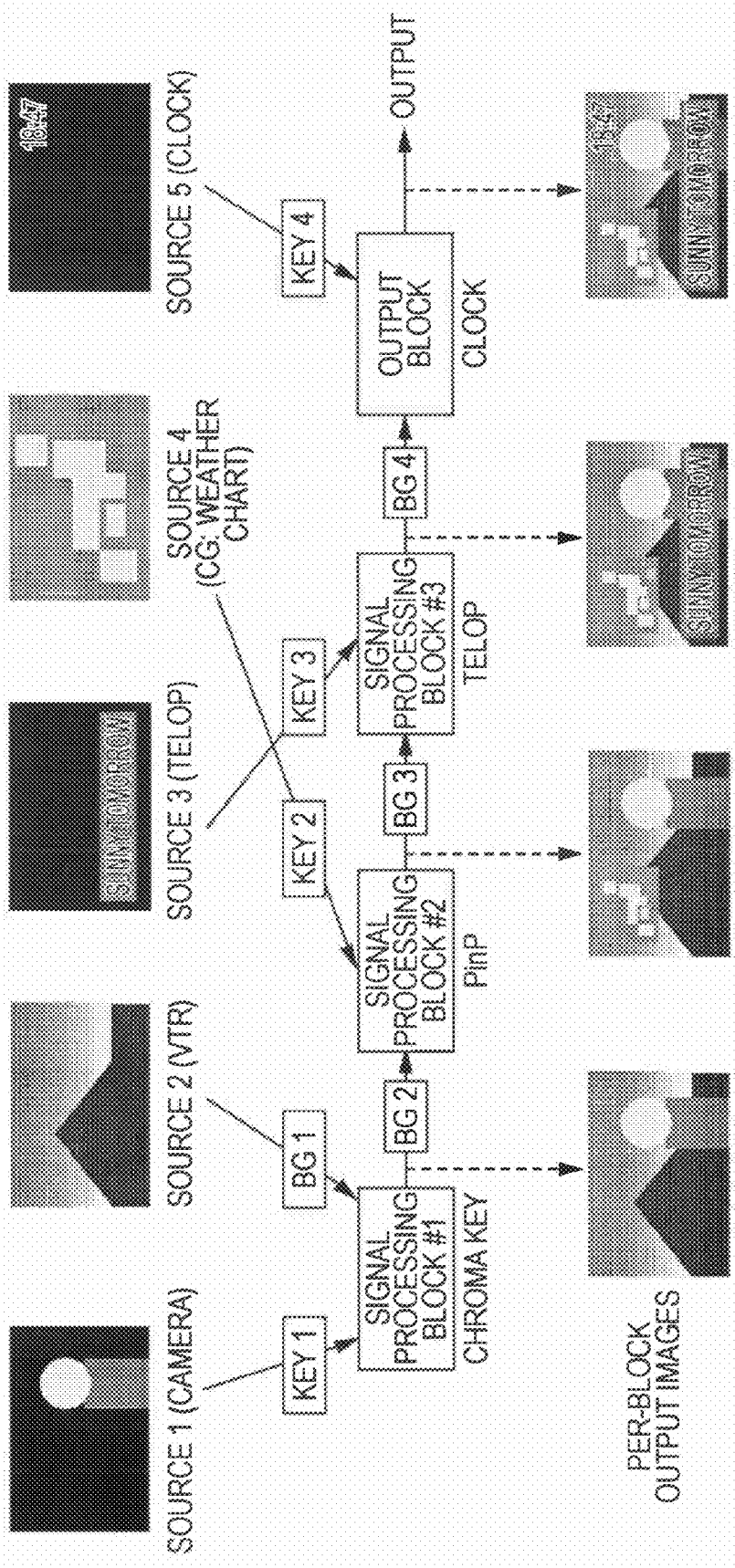
FIG. 12 illustrates an example of image compositing in the case where the output block is used in the final stage (Ex. 1)

Next, two examples of image compositing will be given. FIG. 12 illustrates an example of image compositing in the case where the output block is used in the final stage (Ex. 1). Using source 1 (camera) as key 1 and source 2 (VTR) as background 1, the signal processing block #1 composites key 1 onto background 1 using chroma keying. Using the output of the signal processing block #1 as background 2 and source 4 (CG: weather chart) as key 2, the signal processing block #2 reduces and composites key 2 onto background 2 using PinP. Using the output of the signal processing block #2 as background 3 and source 3 (telop) as key 3, the signal processing block #3 composites key 3 onto background 3. Using the output of the signal processing block #3 as background 4 and source 5 (clock) as key 4, the output block composites key 4 onto background 4.

Figure 13:
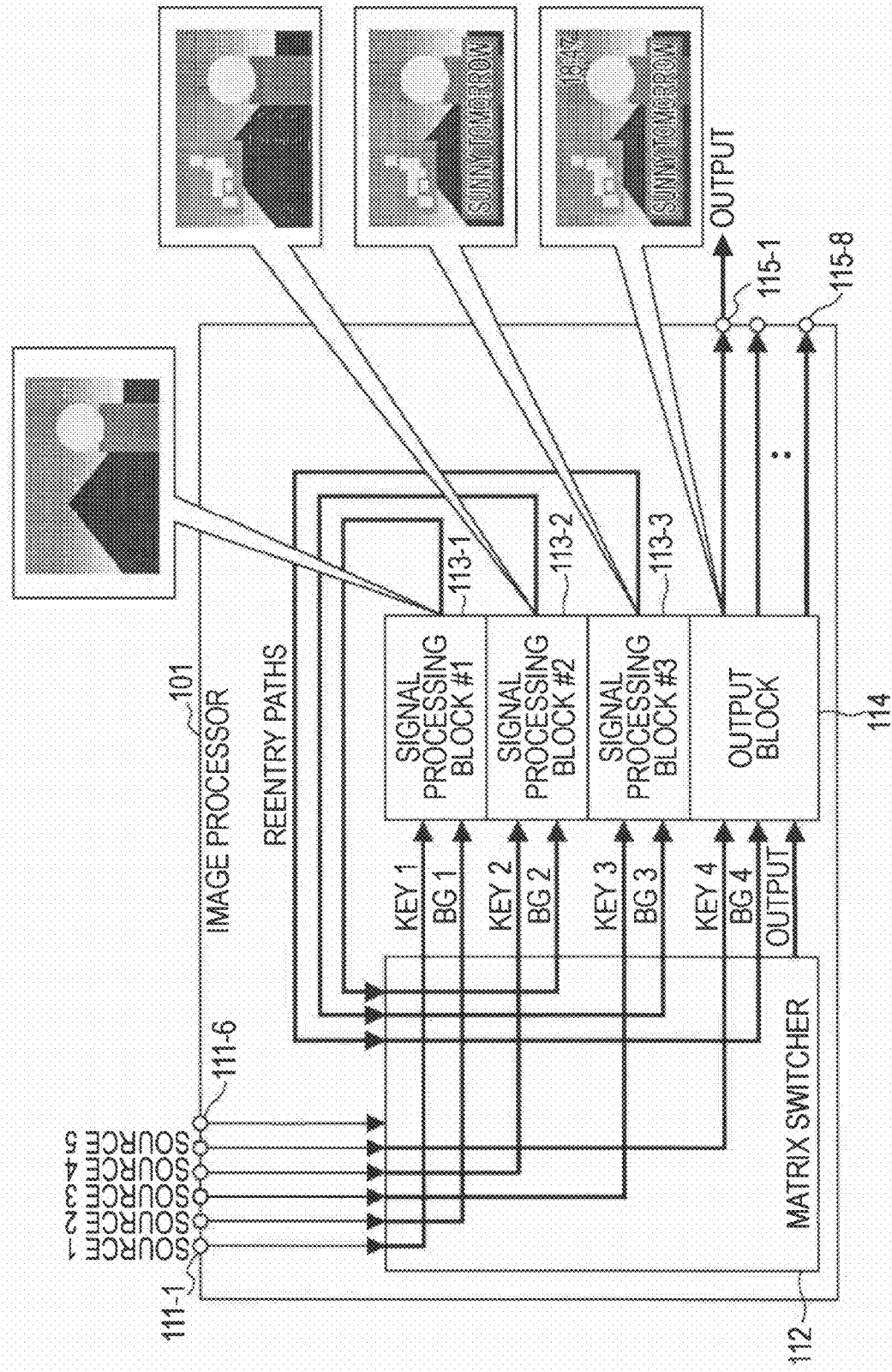
FIG. 13 illustrates connection settings at respective crosspoints of a matrix switcher in the case of realizing the image compositing example wherein the output block is used in the final stage.

FIG. 13 illustrates connection settings at respective crosspoints of the matrix switcher 112 when realizing the image compositing example shown in FIG. 12. FIG. 13 shows the example of the case where external reentry is not used. From these crosspoint connection settings, the following reentry stage information is generated.

Since key 1 is external input (i.e., source 1), and since background 1 is external input (i.e., source 2), the reentry stage number of the signal processing block #1 becomes the first stage. Since key 2 is external input (i.e., source 4), and since background 2 is internal reentry (i.e., the signal processing block #1), the reentry stage number of the signal processing block #2 becomes the second stage. Since key 3 is external input (i.e., source 3), and since background 3 is internal reentry (i.e., the signal processing block #2), the reentry stage number of the signal processing block #3 becomes the third stage. Since key 4 is external input (i.e., source 5), and since background 4 is internal reentry (i.e., the signal processing block #3), the reentry stage number of the output block becomes the fourth stage. Herein, in this case, the output from the output block becomes the final image compositing output.

Figure 14:
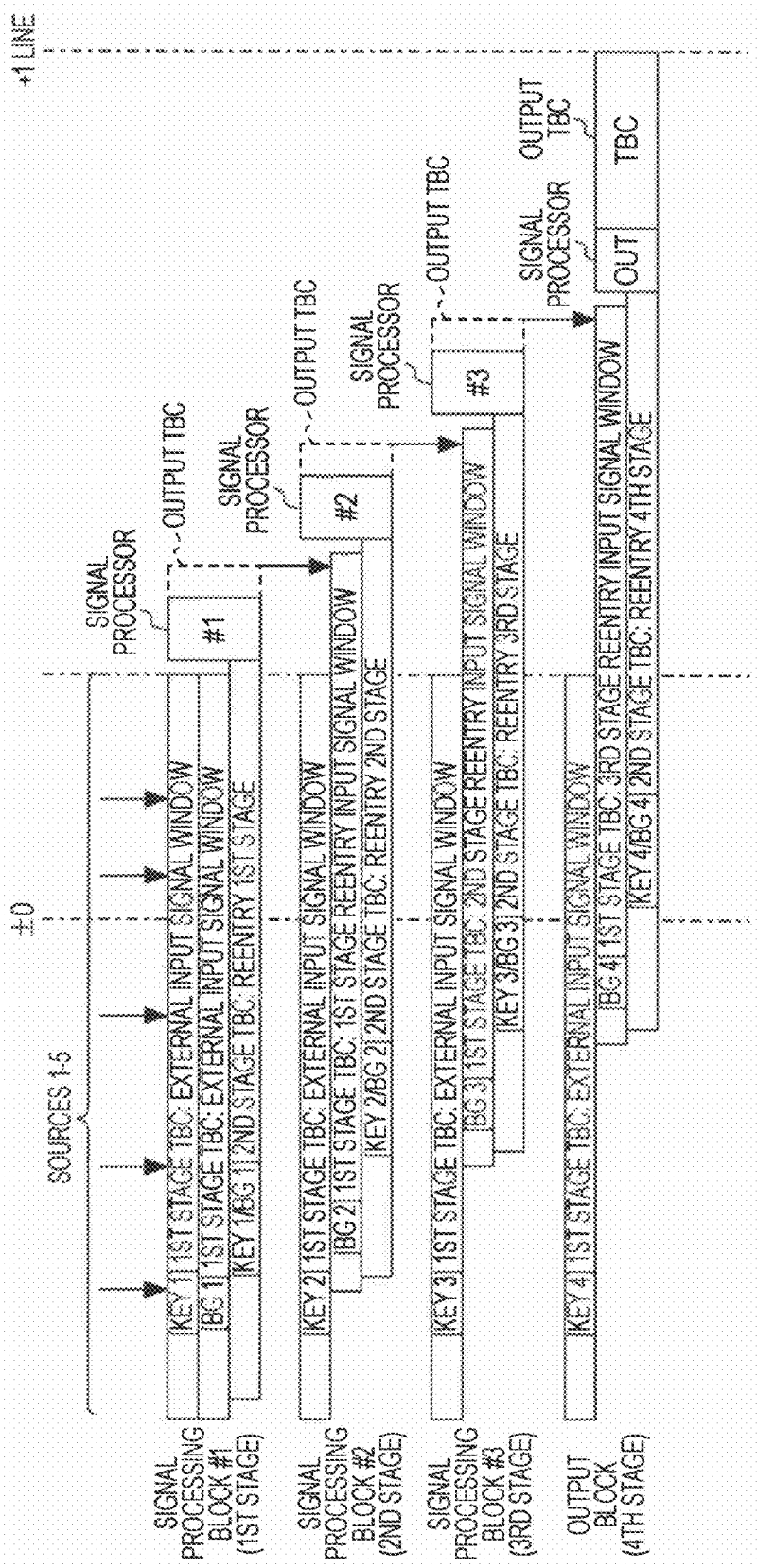
FIG. 14 illustrates an example of per-block phase control (i.e., TBC delay settings) in the case of realizing the image compositing example wherein the output block is used in the final stage.

On the basis of the reentry information generated as described above, phase control is conducted for each block, or in other words, TBC delay settings for each block are set. FIG. 14 illustrates an example of per-block phase control (i.e., TBC delay settings).

In the first-stage signal processing block #1, the source 1 (camera) and source 2 (VTR) input into the upstream first-stage TBCs within the external input signal window are first phase-aligned, and are then input into the signal processor 123 via the upstream second-stage TBCs. Subsequently, the processed signal passes through the downstream TBCs and becomes a reentry input signal for use in the second-stage signal processing block #2.

In the second-stage signal processing block #2, the source 4 (CG: weather chart) input into the upstream first-stage TBCs within the external input signal window is given a fixed output phase, and is then input into the upstream second-stage TBCs. Additionally, in the second-stage signal processing block #2, the reentry input signal input into the upstream first-stage TBCs within the reentry input signal window from the signal processing block #1 is first given a fixed output phase, and is then input into the upstream second-stage TBCs.

In this case, in order to use the reentry input signal from the first-stage signal processing block #1, the reentry input signal window of the upstream first-stage TBCs is delayed by the external input signal window of the upstream first-stage TBCs in the second-stage signal processing block #2. For this reason, in the second-stage signal processing block #2, the outputs of the upstream first-stage TBCs differ in phase, depending on whether the output signal is an external input signal or a reentry input signal.

The external input signal and reentry input signal, being output by the upstream first-stage TBCs and differing in phase as described above, are then phase-aligned by the upstream second-stage TBCs, and are then input into the signal processor 123. Subsequently, the processed signal passes through the downstream TBCs and becomes a reentry input signal for use in the third-stage signal processing block #3.

In the third-stage signal processing block #3, the source 3 (telop) input into the upstream first-stage TBCs within the external input signal window is first given a fixed output phase, and is then input into the upstream second-stage TBCs. Additionally, in the third-stage signal processing block #3, the reentry input signal input into the upstream first-stage TBCs within the reentry input signal window from the signal processing block #2 is first given a fixed output phase, and is then input into the upstream second-stage TBCs.

In this case, in order to use the reentry input signal from the second-stage signal processing block #2, the reentry input signal window of the upstream first-stage TBCs is delayed by the external input signal window of the upstream first-stage TBCs in the third-stage signal processing block #3. For this reason, in the third-stage signal processing block #3, the outputs of the upstream first-stage TBCs differ in phase, depending on whether the output signal is an external input signal or a reentry input signal.

The external input signal and reentry input signal, being output by the upstream first-stage TBCs and differing in phase as described above, are then phase-aligned by the upstream second-stage TBCs, and are then input into the signal processor 123. Subsequently, the processed signal passes through the downstream TBCs and becomes a reentry input signal for use in the fourth-stage output block.

In the fourth-stage output block, the source 5 (clock) input into the upstream first-stage TBCs within the external input signal window is first given a fixed output phase, and is then input into the upstream second-stage TBCs. Additionally, in the fourth-stage output block, the reentry input signal input into the upstream first-stage TBCs within the reentry input signal window is first given a fixed output phase, and is then input into the upstream second-stage TBCs.

In this case, in order to use the reentry input signal from the third-stage signal processing block #3, the reentry input signal window of the upstream first-stage TBCs is delayed by the external input signal window of the upstream first-stage TBCs in the fourth-stage output block. For this reason, in the fourth-stage output block, the outputs of the upstream first-stage TBCs differ in phase, depending on whether the output signal is an external input signal or a reentry input signal.

The external input signal and reentry input signal, being output by the upstream first-stage TBCs and differing in phase as described above, are then phase-aligned by the upstream second-stage TBCs, and are then input into the signal processor 123. Subsequently, the processed signal is output by the downstream TBCs with its output phase one line-delayed.

Figure 15:
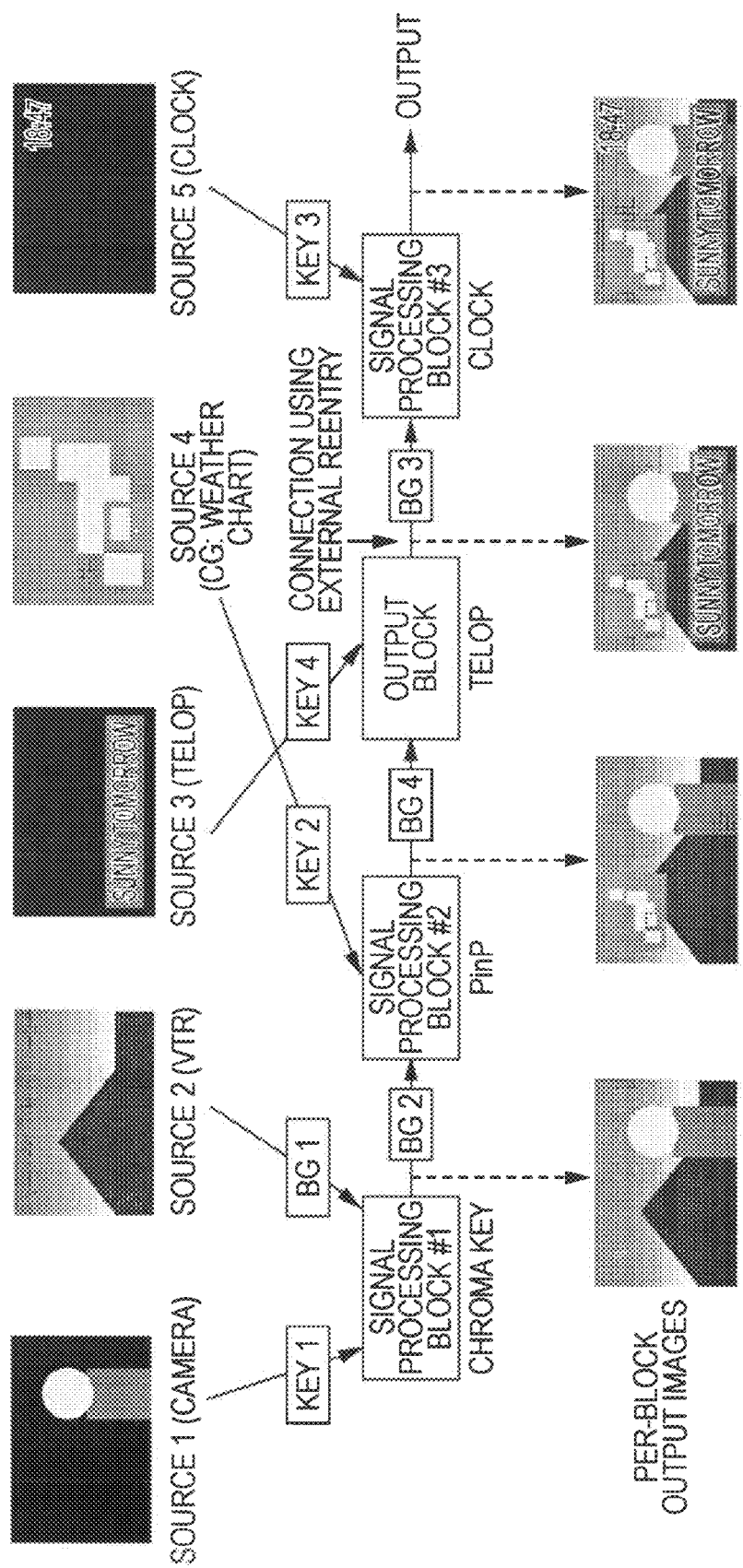
FIG. 15 illustrates an example of image compositing in the case where the output block is used partway along the path (Ex. 2)

FIG. 15 illustrates an example of image compositing in the case where the output block is used partway along the path (Ex. 2). Using source 1 (camera) as key 1 and source 2 (VTR) as background 1, the signal processing block #1 composites key 1 onto background 1 using chroma keying. Using the output of the signal processing block #1 as background 2 and source 4 (CG: weather chart) as key 2, the signal processing block #2 reduces and composites key 2 onto background 2 using PinP. Using the output of the signal processing block #2 as background 4 and source 3 (telop) as key 4, the output block composites key 4 onto background 4. Using the output of the output block as background 3 and source 5 (clock) as key 3, the signal processing block #3 composites key 3 onto background 3.

Figure 16:
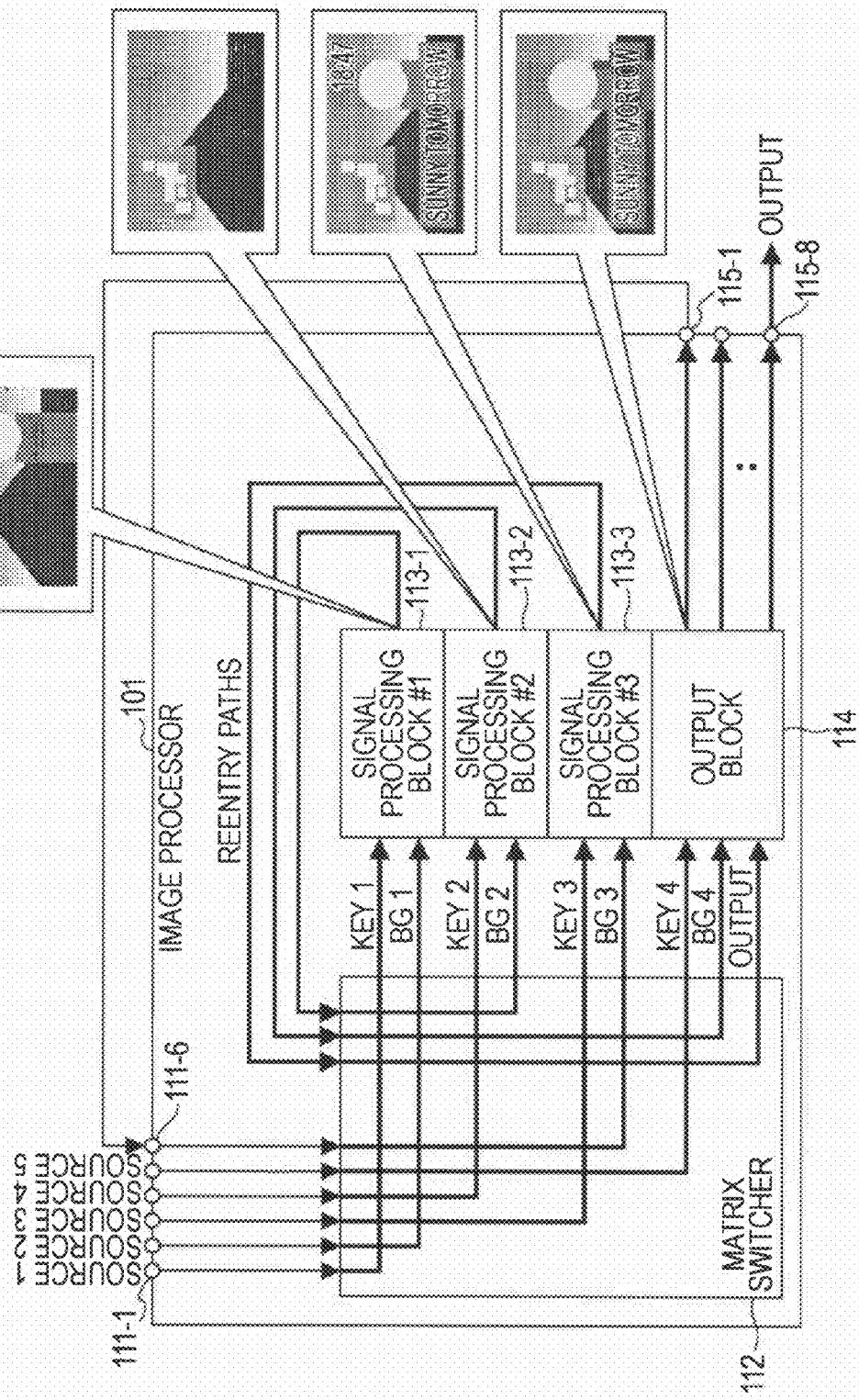
FIG. 16 illustrates connection settings at respective crosspoints of the matrix switcher in the case of realizing the image compositing example wherein the output block is used partway along the path.

FIG. 16 illustrates connection settings at respective crosspoints of the matrix switcher 112 when realizing the image compositing example shown in FIG. 15. FIG. 16 shows the example of the case where external reentry is used. From these crosspoint connection settings, the following reentry stage information is generated.

Since key 1 is external input (i.e., source 1), and since background 1 is external input (i.e., source 2), the reentry stage number of the signal processing block #1 becomes the first stage. Since key 2 is external input (i.e., source 4), and since background 2 is internal reentry (i.e., the signal processing block #1), the reentry stage number of the signal processing block #2 becomes the second stage. Since key 3 is external input (i.e., source 3), and since background 3 is external reentry (i.e., the output block), the reentry stage number of the signal processing block #3 becomes the fourth stage. Since key 4 is external input (i.e., source 5), and since background 4 is internal reentry (i.e., the signal processing block #3), the reentry stage number of the output block (more specifically, the portion of the output block used for external reentry) becomes the third stage. Herein, in this case, the internal reentry (i.e., the output from the signal processing block #3) becomes the final image compositing output.

Figure 17:
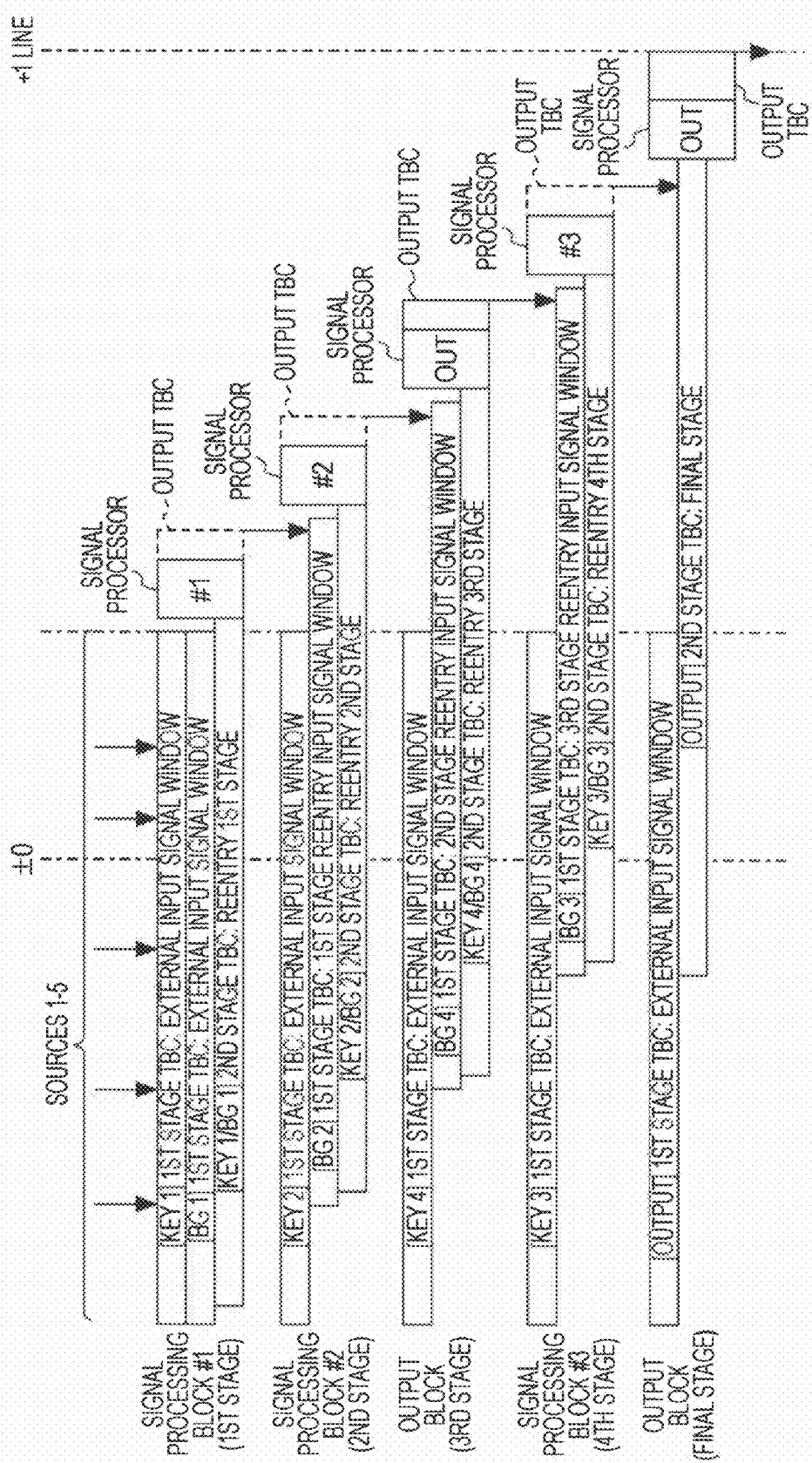
FIG. 17 illustrates an example of per-block phase control (i.e., TBC delay settings) in the case of realizing the image compositing example wherein the output block is used partway along the path.
Figure 18:
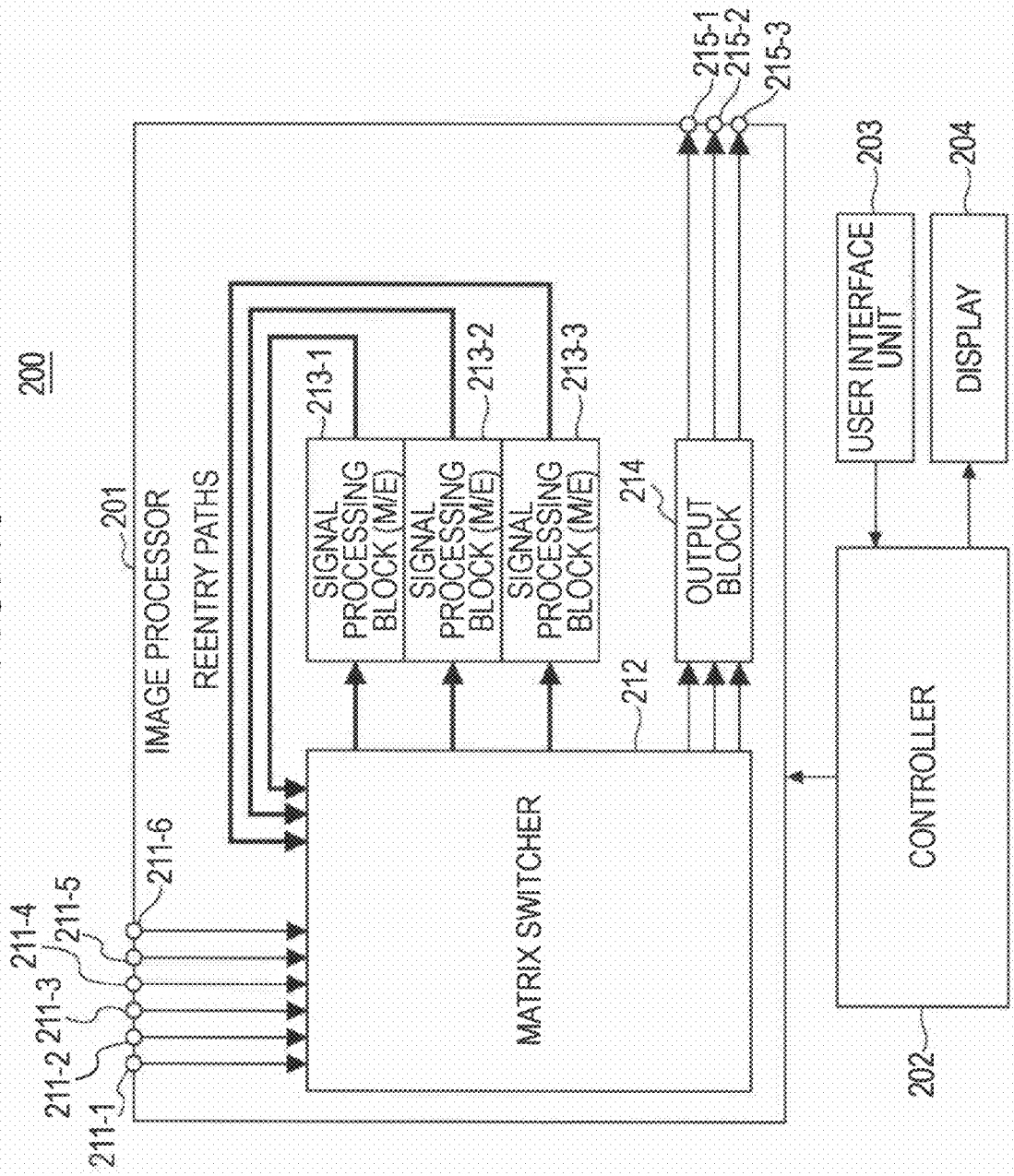
FIG. 18 is a block diagram illustrating an exemplary configuration of an image processing apparatus of the related art.

On the basis of the reentry information generated as described above, phase control is conducted for each block, or in other words, TBC delay settings for each block are set. FIG. 17 illustrates an example of per-block phase control (i.e., TBC delay settings).

In the first-stage signal processing block #1, the source 1 (camera) and source 2 (VTR) input into the upstream first-stage TBCs within the external input signal window are first phase-aligned, and are then input into the signal processor 123 via the upstream second-stage TBCs. Subsequently, the processed signal passes through the downstream TBCs and becomes a reentry input signal for use in the second-stage signal processing block #2.

In the second-stage signal processing block #2, the source 4 (CG: weather chart) input into the upstream first-stage TBCs within the external input signal window is given a fixed output phase, and is then input into the upstream second-stage TBCs. Additionally, in the second-stage signal processing block #2, the reentry input signal input into the upstream first-stage TBCs within the reentry input signal window from the signal processing block #1 is first given a fixed output phase, and is then input into the upstream second-stage TBCs.

In this case, in order to use the reentry input signal from the first-stage signal processing block #1, the reentry input signal window of the upstream first-stage TBCs is delayed by the external input signal window of the upstream first-stage TBCs in the second-stage signal processing block #2. For this reason, in the second-stage signal processing block #2, the outputs of the upstream first-stage TBCs differ in phase, depending on whether the output signal is an external input signal or a reentry input signal.

The external input signal and reentry input signal, being output by the upstream first-stage TBCs and differing in phase as described above, are then phase-aligned by the upstream second-stage TBCs, and are then input into the signal processor 123. Subsequently, the processed signal passes through the downstream TBCs and becomes a reentry input signal for use in the third-stage output block.

In the third-stage output signal, the source 3 (telop) input into the upstream first-stage TBCs within the external input signal window is first given a fixed output phase, and is then input into the upstream second-stage TBCs. Additionally, in the third-stage output block, the reentry input signal input into the upstream first-stage TBCs within the reentry input signal window from the signal processing block #2 is first given a fixed output phase, and is then input into the upstream second-stage TBCs.

In this case, in order to use the reentry input signal from the second-stage signal processing block #2, the reentry input signal window of the upstream first-stage TBCs is delayed by the external input signal window of the upstream first-stage TBCs in the third-stage output block. For this reason, in the third-stage output block, the outputs of the upstream first-stage TBCs differ in phase, depending on whether the output signal is an external input signal or a reentry input signal.

The external input signal and reentry input signal, being output by the upstream first-stage TBCs and differing in phase as described above, are then phase-aligned by the upstream second-stage TBCs, and are then input into the signal processor 123. Subsequently, the processed signal passes through the downstream TBCs and becomes a reentry input signal for use in the fourth-stage signal processing block #3.

In the fourth-stage signal processing block #3, the source 5 (clock) input into the upstream first-stage TBCs within the external input signal window is first given a fixed output phase, and is then input into the upstream second-stage TBCs. Additionally, in the fourth-stage signal processing block #3, the reentry input signal input into the upstream first-stage TBCs within the reentry input signal window is first given a fixed output phase, and is then input into the upstream second-stage TBCs.

In this case, in order to use the reentry input signal from the third-stage output block, the reentry input signal window of the upstream first-stage TBCs is delayed by the external input signal window of the upstream first-stage TBCs in the fourth-stage signal processing block #3. For this reason, in the fourth-stage signal processing block #3, the outputs of the upstream first-stage TBCs differ in phase, depending on whether the output signal is an external input signal or a reentry input signal.

The external input signal and reentry input signal, being output by the upstream first-stage TBCs and differing in phase as described above, are then phase-aligned by the upstream second-stage TBCs, and are then input into the signal processor 123. Subsequently, the processed signal passes through the output TBCs and becomes a reentry signal for use in the final-stage output block.

In the final-stage output block, the reentry input signal input into the upstream first-stage TBCs within the reentry input signal windows is first given a fixed output phase, and is then output via the upstream second-stage TBCs, the signal processor 123, and the downstream TBCs, and with its output phase one line-delayed.

In the image processing apparatus 100 shown in FIG. 1, in order to use the special function unit of the output block 114 on the upstream side of the internal signal processing path, the output port corresponding to the special function unit (i.e., the first port) is connected to a predetermined input port (i.e., the second port) via an external cable 116. At this point, external reentry input/output port settings corresponding to this connection are set, and on the basis of those settings, the special function unit of the output block is treated in the same manner as a signal processing block. Consequently, the special function unit of the output block becomes usable on the upstream side of the internal signal processing path, without modifying the hardware configuration of the image processor.

<2. Modification>

In the foregoing embodiment, the image processor 101 is described as having six input ports 111-1 to 111-6, eight output ports 115-1 to 115-8, as well as three signal processing blocks (M/E blocks) 113-1 to 113-3. However, it should be appreciated that the respective numbers of such components in an embodiment of the present invention is not limited to the numbers given in the foregoing embodiment.

The present application contains subject matter related to that disclosed in Japanese Priority Patent Application JP 2009-095480 filed in the Japan Patent Office on Apr. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   an image processor, configured to include
      a matrix switcher having a plurality of input lines arranged in one direction, a plurality of output lines arranged in another direction and intersecting the input lines, and a plurality of crosspoint switches, which connect the input lines to the output lines at each crosspoint where the input lines and the output lines intersect,
      a signal processing block, connected to a portion of the output lines of the matrix switcher on the upstream side, and connected to a portion of the input lines of the matrix switcher by reentry paths on the downstream side thereof, and
      an output block, connected to a portion of the output lines of the matrix switcher on the upstream side thereof;
      an external reentry settings unit, configured to set a first port selected from the plurality of output ports in the matrix switcher as an external reentry output port, and to set a second port selected from the plurality of input ports in the matrix switcher as an external reentry output port; and
      a reentry stage information generator, configured to use connection settings information for each crosspoint of the matrix switcher as well as the settings information of the external reentry settings unit as a basis for generating reentry stage information, which indicates the stage of the internal signal processing path where a special function unit is logically positioned, and wherein the special function unit corresponds to the external reentry output ports of the signal processing block and the output block.

2. The image processing apparatus according to claim 1, further comprising:
   a controller, configured to control signal processing in the signal processing block and in the special function of the output block on the basis of reentry stage information generated by the reentry stage information generator.

3. The image processing apparatus according to claim 1, further comprising:
   a phase controller, configured to control the phase of the outputs from the signal processing block and the special function unit of the output block on the basis of reentry stage information generated by the reentry stage information generator.

4. The image processing apparatus according to claim 1, wherein
   the reentry stage information generator respectively determines the stages of the internal signal processing path where the signal processing block and the special function unit of the output block are logically positioned on the basis of the maximum value of reentry stages for all signals to be used by the signal processing block or the special function unit.

5. The image processing apparatus according to claim 1, wherein
   the special function unit of the output block is a downstream keyer.

6. A control method for an image processor, the image processor being configured to include
   a matrix switcher having a plurality of input lines arranged in one direction, a plurality of output lines arranged in another direction and intersecting the input lines, and a plurality of crosspoint switches, which connect the input lines to the output lines at each crosspoint where the input lines and the output lines intersect,
   a signal processing block, connected to a portion of the output lines of the matrix switcher on the upstream side, and connected to a portion of the input lines of the matrix switcher by reentry paths on the downstream side thereof, and
   an output block, connected to a portion of the output lines of the matrix switcher on the upstream side thereof, and the method comprising the steps of:
   setting a first port selected from the plurality of output ports in the matrix switcher as an external reentry output port, and setting a second port selected from the plurality of input ports in the matrix switcher as an external reentry output port; and
   using connection settings information for each crosspoint of the matrix switcher as well as the settings information of the external reentry settings unit as a basis for generating reentry stage information, which indicates the stage of the internal signal processing path where a special function unit is logically positioned, and wherein the special function unit corresponds to the external reentry output ports of the signal processing block and the output block.

7. The control method according to claim 6, further comprising the step of:

controlling the phase of the outputs from the signal processing block and the special function unit of the output block on the basis of reentry stage information generated in the reentry stage information generating step.

* * * * *